(12) United States Patent
Stefik et al.

(10) Patent No.: US 10,013,459 B2
(45) Date of Patent: Jul. 3, 2018

(54) COMPUTER-IMPLEMENTED SYSTEM AND METHOD FOR INTEGRATING HUMAN OBSERVATIONS INTO ANALYTICS DATA

(71) Applicant: Palo Alto Research Center Incorporated, Palo Alto, CA (US)

(72) Inventors: Mark Jeffrey Stefik, Portola Valley, CA (US); Craig Eldershaw, Belmont, CA (US); Lu Jia, Mountain View, CA (US); Pai Liu, Sunnyvale, CA (US); Makiko Taniguchi, San Francisco, CA (US); Sureyya Tarkan, Palo Alto, CA (US); Francisco Eduardo Torres, San Jose, CA (US); Edward Wu, San Jose, CA (US); Peter Jarvis, Sunnyvale, CA (US)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 758 days.

(21) Appl. No.: 14/265,333

(22) Filed: Apr. 29, 2014

(65) Prior Publication Data
US 2015/0310070 A1  Oct. 29, 2015

(51) Int. Cl.
*G06F 7/00* (2006.01)
*G06F 17/30* (2006.01)
*G06Q 10/06* (2012.01)

(52) U.S. Cl.
CPC .. *G06F 17/30525* (2013.01); *G06F 17/30598* (2013.01); *G06F 17/30864* (2013.01); *G06Q 10/06* (2013.01)

(58) Field of Classification Search
None
See application file for complete search history.

(56) References Cited

U.S. PATENT DOCUMENTS

| 2005/0198021 | A1* | 9/2005 | Wilcox | G06Q 10/06 |
| 2007/0094248 | A1* | 4/2007 | McVeigh | G06F 17/3089 |
| 2007/0250810 | A1* | 10/2007 | Tittizer | G06F 8/73 717/110 |

(Continued)

OTHER PUBLICATIONS

Malone et al., "The Information Lens: An Intelligent System for Information Sharing in Organizations," Center for Information Systems Research, p. 2-21, Jan. 1986.

(Continued)

*Primary Examiner* — Thu Nga Nguyen
(74) *Attorney, Agent, or Firm* — Patrick J. S. Inouye; Leonid Kisselev

(57) ABSTRACT

A computer-implemented system and method for integrating user observations into operational data is provided. A database maintains notes each having received from a user and comprising a subjective observation. Operational data including workflow data of an objective nature is defined. Each of the notes is associated with one or more tags. The note associated with the tags is further maintained in the database. Criteria for retrieving the note are defined for the workflow data and forming a query for each of the workflow data. The query to select the note associated with the tags is executed for the workflow data based on the criteria and the selected note is integrated into the workflow data. The workflow data with the integrated note is displayed on a display.

19 Claims, 20 Drawing Sheets

(56) References Cited

U.S. PATENT DOCUMENTS

2010/0174555 A1\* 7/2010 Abraham-Fuchs ... G06F 19/328
 705/3
2012/0111936 A1 5/2012 Brown et al.
2013/0085798 A1\* 4/2013 Spatola ................. G06Q 10/06
 705/7.24

OTHER PUBLICATIONS

Lai et al., "Object Lens: A 'Spreadsheet' for Cooperative Work," Association for Computing Machinery, p. 1-36, Sep. 1988.
Heer et al., "Voyagers and Voyeurs: Supporting Asynchronous Collaborative Information Visualization," Proceedings of the ACM Conference on Human Factors in Computing Systems (CHI), Apr. 28-May 3, 2007, San Jose, CA.

\* cited by examiner

| Co Name | Review▼ | Plan▼ | | | | | Sergeant Swanson▼ |

Notes Search

241

Search For [weather] [Search]

Filters

243

| | | | | | | |
|---|---|---|---|---|---|---|
| IN THE LAST | YEAR | MONTH | WEEK | DAY | CUSTOM | |
| SEARCH WITHIN | ALL | NOTE BODY | NOTE TAGS | NOTE AUTHOR | NOTE COMMENTER | |
| AUTHOR RANK | ALL | CAPTAIN | LIEUTENANT | SERGEANT | OFFICER | |
| SHIFT | ALL | AM | DAY | LATE MD | MD DAY | PM |
| REGION | ALL | AREA | SQUAD | BEAT | | |
| SQUAD | ALL | SQUAD 1 | SQUAD 2 | SQUAD 3 | SQUAD 4 | SQUAD 5 | SQUAD 6 | SQUAD 7 | SQUAD 8 |

Results

242

Sergeant Jackson  October 17th, 2013 10:20 AM
This was a tough day, we had a huge downpour this afternoon as well as a convention which accounted for a lot of traffic enforcement duty
[#convention] [#weather] [#rain] [new tag]
Leave Comment

Sergeant Smith  October 17th, 2013 1:12 PM
Significant rain today, we were unable to meet our targets due to the bad conditions
[#rain] [#weather] [new tag]
Leave Comment

Sergeant Anderson October 14th, 2013 11:12 PM
Two of my officers had PocketPEO malfunctions today due to the extremely humid weather. They had to come all the way back to the station, pick up new devices, and return to their beats. This caused a miss in our performance.
[#humidity] [#pocketpass] [#weather] [#malfunction] [new tag]
Leave Comment

FIG. 19

COMPUTER-IMPLEMENTED SYSTEM AND METHOD FOR INTEGRATING HUMAN OBSERVATIONS INTO ANALYTICS DATA

FIELD

This application relates in general to data management and, in particular, to a computer-implemented system and method for integrating user observations into analytics data.

BACKGROUND

Organizations that carry out services in complex operational settings, such as governments, hospitals, banks, companies, and universities, process a tremendous amount of day-to-day transactions. Besides their large scale of daily operations, organizations, especially organizations with mobile workers or workers at multiple sites, such as local governments, including city transportation and public safety organizations, and hospitals, are required to administer various unaccustomed events and circumstances on a daily basis. For example, local governments play roles in various functions, such as city or town development, tourism, public works, parks and recreation, police, fire, emergency services, transportation, housing, and so on. Similarly, services provided by hospitals vary greatly from patient to patient. However, current operating systems for organizations are not capable of recording and classifying all the business operations. For managing such complex business operations, an operating system for organizations must encompass a broad range of operations with due consideration to the changing environment.

Commonly, organizational operating systems are divided into four categories of information systems, such as voice and text messaging systems, workflow systems, data analytics, and structured document collection, and each system carries advantages and disadvantages. First, voice and text messaging systems carry information and coordinate activities in organizations. Email, voicemail, and text messages are usually designed to deliver messages between individuals within an organization by typically specifying a receiver of the messages. Thus, information regarding the messages are usually shared only between the sender and receivers. Even when the context of the message between the sender and the receiver shifts while exchanging messages in one message thread, only the same individuals are involved in the message thread. Manually adding a new receiver into the message thread or specifying a group of individuals as receivers can be an alternative to share the message information with other individuals in the organization but that is not a sufficient solution as an operating system. Further, the message information cannot be processed as data and makes further processing, such as data analytics for aiding organizational activities, difficult.

Secondly, workflow systems orchestrate daily routine operations of the organization into an accessible platform for use by individuals of the organization. The workflow systems break organizational routine operations into smaller tasks so that each individual in the organization can efficiently process and manage a sequence of tasks. However, the workflow system is not adequate to respond to variable and complex environments as the workflow systems are designed for only facilitating routine tasks. In other words, preparing detailed step-by-step decision guidance for responding to complex environments and integrating human observations into the workflow system exceed a capacity of the workflow system.

Further, data analytics present a pattern in data by collecting and statistically processing data. Data analytics can guide organizations in their ongoing operations by reviewing and planning data, usually with visualization. However, data analytics are quantitative and do not generally integrate open-ended, contextual, and unstructured information.

Finally, document collection includes storing documents and metadata in a database and provides file repositories. The stored data in the repositories can be obtained by using a search function. However, for variable types of documents and metadata, generality of the search function is difficult. For example, calendars, spreadsheets, and event planning have special page types. Further, performing data analytics among variable types of data in the database has been unlikely to be successful. Thus, each current operating system falls short for organizations to manage their complex operations.

Structured email systems are disclosed in Malone et al., "The Information Lens: Intelligent Information Sharing Systems," Communications of the ACM, Vol. 30, No. 5, p. 390-402, May 1986 and Lai et al., "Object Lens: A 'Spreadsheet' for Cooperative Work," ACM Transactions on Office Information Systems, Vol. 6, No. 4, p. 332-353, October 1986, the disclosures of which are incorporated by reference. Emails, such as only formulaic kinds of conversations, are structured for a computer system to access and process data elements.

Comments can be incorporated into analytics, such as described in Heer et al., "Voyagers and Voyeurs: Supporting Asynchronous Collaborative Information Visualization," Proceedings of the ACM Conference on Human Factors in Computing Systems (CHI), Apr. 28-May 3, 2007, San Jose, Calif. Sense.us, which is a system for collaborative visualization, provides a Web-based exploratory analysis framework for U.S. Census data. The Sense.us supports collaboration via commentary threaded conversations via views on data. The comments are connected to the analytics data but do not become a part of data. Similarly, Google Analytics, provided by Google, Inc., Mountain View, Calif., enable to attach comments by users on a visualized analytics data; however, the comments are kept separate from the analytics data.

There is a need for organizing variable unstructured data and incorporating into the analytics data for managing and developing ongoing organizational operations.

SUMMARY

A reflective analytics system which collects data outside of a regular operational framework of an organization, such as individual observations and information as notes or annotations that can be read and processed by both people and computers, and can integrate into the analytics data generates system level knowledge and facilitates operational decision making with consideration of all the activities in the organization including objective and subjective data. The system adds tags to the notes to guide processing and can auto-fill various information such as time and place of the note and other contextual information about the user's current activity. The system further includes an intelligent processor that can analyze and retrieve information from the notes, displaying the notes in context in analytics, and computing trends and other aggregated conclusions from the stream of notes.

One embodiment provides a computer-implemented method for integrating user observations into operational data. A database maintains notes each having received from a user and comprising a subjective observation. Operational data including workflow data of an objective nature is defined. Each of the notes is associated with one or more of tags. The note associated with the tags is further maintained in the database. Criteria for retrieving the note are defined for the workflow data and forming a query for each of the workflow data. The query to select the notes associated with the tags is executed for the workflow and analytics data based on the criteria so that the selected note can be integrated into the workflow data. The workflow data with the integrated note is displayed on a display.

A further embodiment provides a computer-implemented method for integrating user observations into analytics data. Organizational workflow data of an objective nature including structured data for operating transactions in an organization is maintained. A database maintains annotations and each annotation is received from a user who belongs to the organization as a creator and comprising a subjective observation. Each of the annotations is tagged with one or more of tags. The tagged annotation is embedded into the structured data by determining relevance of the tagged annotation to each of the structured data. Data processing of the structured data is performed analytics data based on the processed structured data with the embedded tagged annotation is visualized on a user interface.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 11 is a screenshot showing, by way of example, a Web page of a table analytic for reviewing performance of each agent for a specific task.

FIG. 13 is a screenshot showing, by way of example, a Web page displaying notes for use in the table analytic of FIG. 12.

FIG. 19 is a screenshot showing, by way of example, a Web page for searching notes from a database.

DETAILED DESCRIPTION

Figure 1:
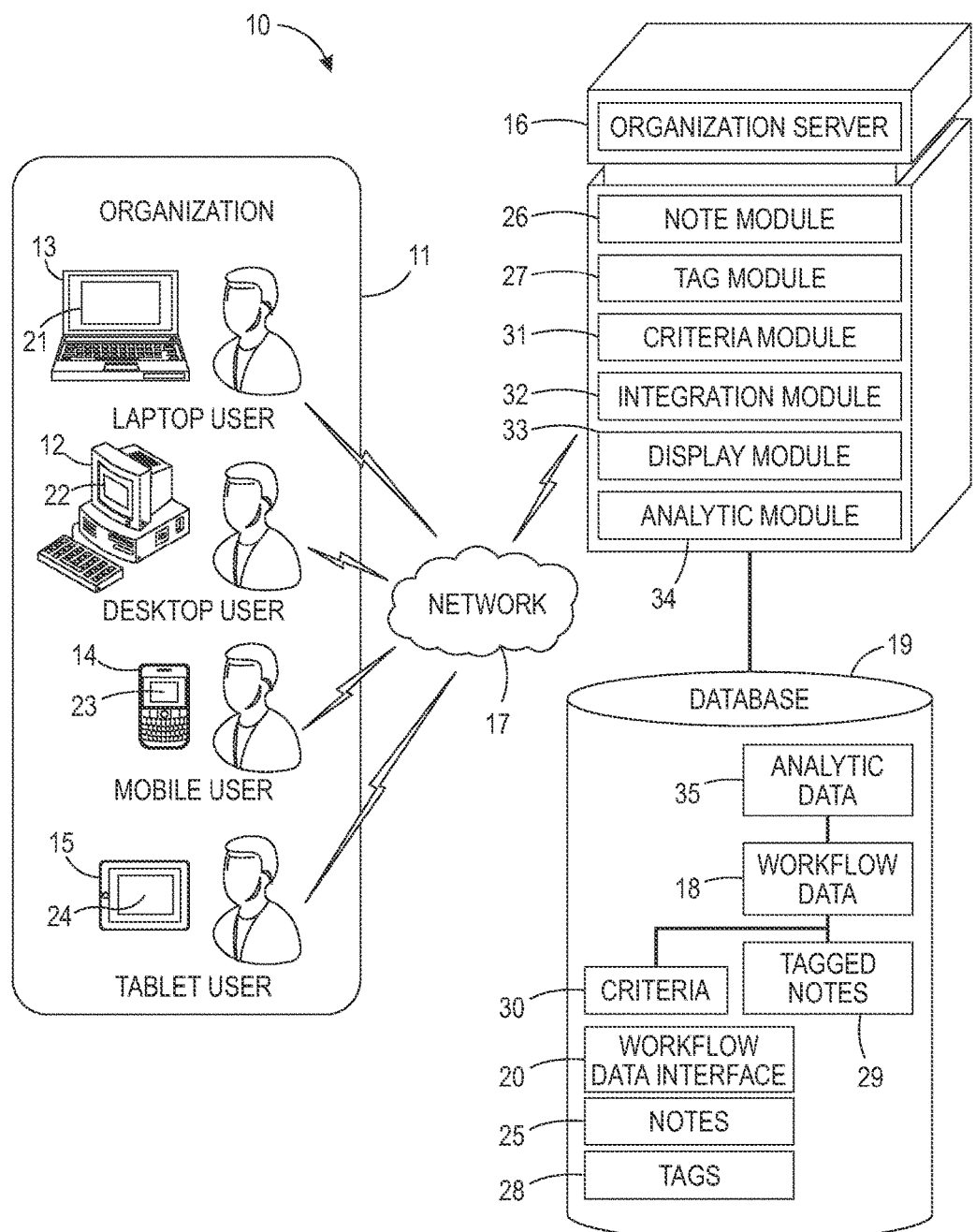
FIG. 1 is a functional block diagram showing a computer-implemented system for integrating user observations into analytics data in accordance with one embodiment.

Obtaining analytics data reflected with user observations assist an organization to manage their ongoing daily operations more efficiently. FIG. 1 is a functional block diagram showing a computer-implemented system 10 for integrating user observations into analytics data in accordance with one embodiment. Organization 11, such as governments and hospitals, employs many workers for various roles in the organization. Some of the workers are working on multiple sites for performing their roles and mobile. Those mobile workers 12-15 can remotely access an organization server 16 over a wide area public data communications network 17, such as the Internet, using wired or wireless connections via a desktop 12, portable 13, or mobile 14, 15 computers.

Figure 3:
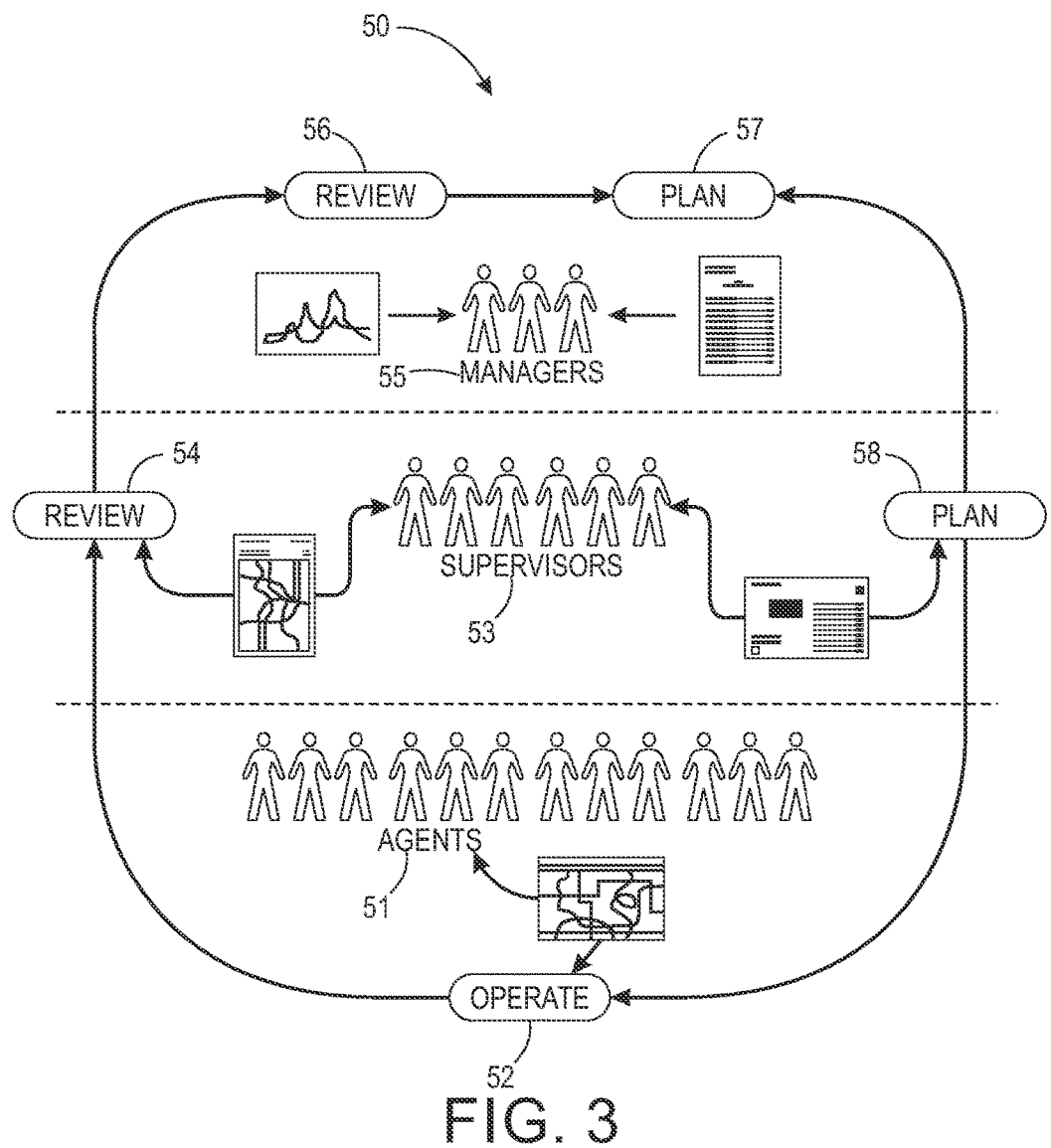
FIG. 3 is a process flow diagram showing, by way of example, an organizational workflow for use in the method of FIG. 2.

The organization server 16 manages a large scale of organization operating data (not shown) necessary for operating all the transactions and other organization specific matters, as further described infra with reference to FIG. 3. The mobile workers 12-15 can access workflow data 18 stored in a database 19 interconnected to the organization server 16 through a workflow data interface 20 while they perform their tasks. The workflow data 18 can be provided to computers of the mobile workers 12-15 through a Web interface 21, 22 or mobile application 23, 24, such as a dashboard application, as well as other types of user interfaces. The workflow data 18 is used to manage routine and regular tasks conducted in the organization on a daily basis and mostly contain objective quantified data. For instance, the workflow data 18 regarding city transportation systems can include parking violation data, ongoing construction data, and traffic congestion data. As another example, the workflow data 18 regarding a public safety organization can include accident data and citation data. Other types of workflow data 18 are possible.

While the mobile workers 12-15 are accessing the workflow data 18, they can create a note or annotation 25 directed to the workflow data 18 through the user interfaces 21-24 via the computers 12-15. The notes 25 from the mobile workers 12-15 can include subjective observations and remarks regarding the workflow data 18, as further described infra with reference to FIG. 4. A note module 26 recognizes the notes 25 received from the mobile workers 12-15 through the workflow data interface 20 and stores the notes 25 in the database 19. Further, the notes 25 are tagged as they are created through the workflow data interface 20, as further described infra with reference to FIG. 6. A tag module 27 can automatically create tags 28 associated with the notes 25, such as time and location data, an identifier of the mobile workers 12-15 who create the notes 25, and work activity of the mobile workers 12-15. Further, the tag module 27 can provide predefined tags 28 to the mobile workers 12-15 for a selection that best matches to the work activity performed by the mobile workers 12-15 or that best describes a nature or context of the notes 25. In a further embodiment, the tags 28 can be manually entered by the mobile workers 12-15 to indicate a purpose of the notes 25, a priority, and the length of the matter described in the notes 25. All the automatic tags, predefined tags, and manually entered tags are maintained in the database 19. Other types of tags are possible.

Figure 8:
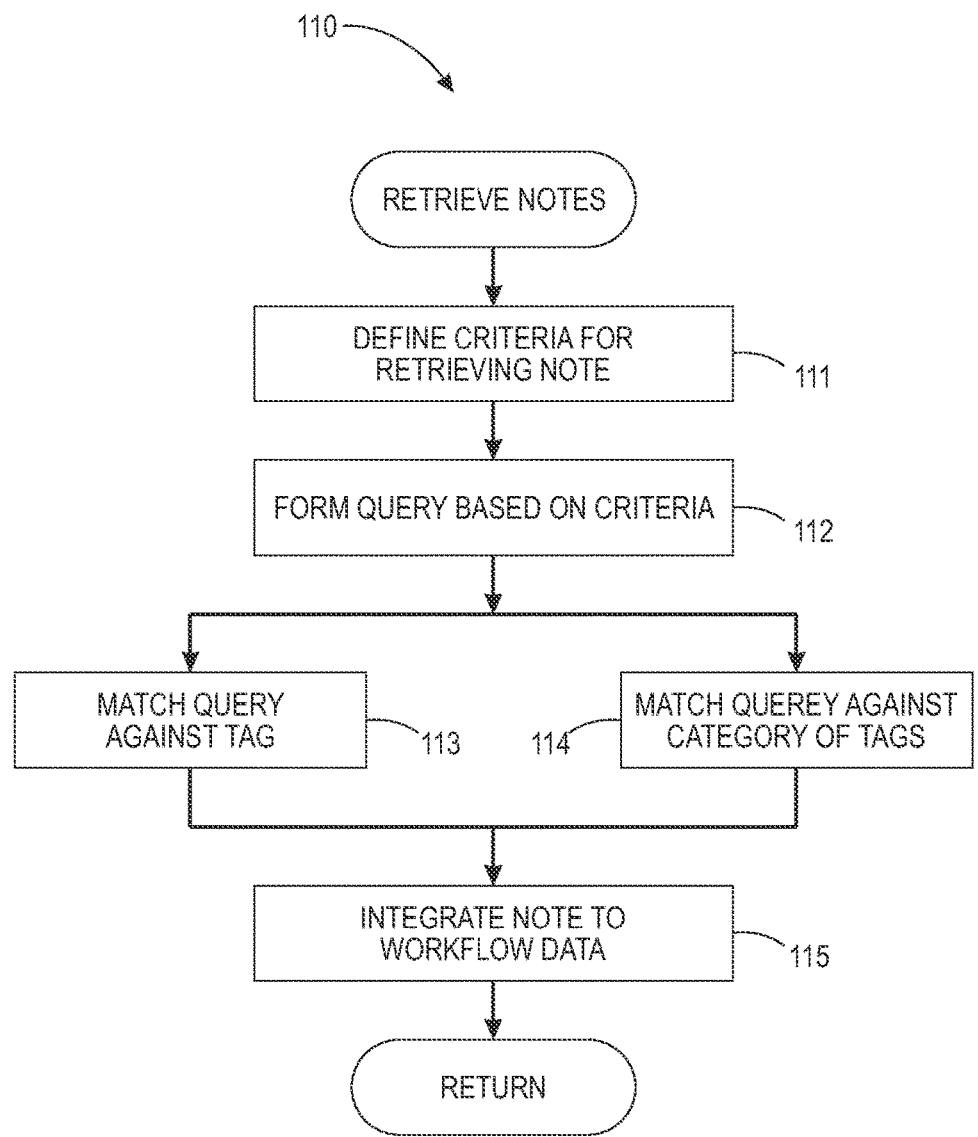
FIG. 8 is a flow diagram showing a routine for retrieving notes into workflow data for use in the method of FIG. 2.

The notes 25 associated with the tags 28 are maintained as tagged notes 29 and integrated into the workflow data 18 based on criteria 30 of the workflow data 18, as further described infra with reference to FIG. 8. A criteria module 31 identifies criteria stored in the database 19 for each workflow data 18 and selects a tagged note 29 which is relevant to the workflow data 18. Then, an integration module 32 pairs the tagged note 29 with the relevant workflow data 18 and integrates the tagged note 29 as a part of the workflow data 18. A display module 33 sends the workflow data 18 associated with the tagged note 29 for display on the user interfaces 21-24. In a further embodiment, the tagged note 29 can be aggregated into the workflow data 18 and processed for analytics. By the analytics process, the workflow data 18 and the tagged note 29 are analyzed to obtain analytic data 35, such as statistical quantitative data, by an analytic module 34. The analytic data 35 can be shown as maps, timelines, charts, tables, and other structures on a display of the computers used by the mobile workers 12-15, as further described infra with reference to FIGS. 10-12.

Each computer 12-15 includes components conventionally found in general purpose programmable computing devices, such as essential processing unit, memory, input/output ports, network interfaces, and known-volatile storage, although other components are possible. Additionally, the computers 12-15 and workflow server 18, analytics server 19, and intelligent engine 20 can each include one or more modules for carrying out the embodiments disclosed herein. The modules can be implemented as a computer program or procedure written as a source code in a conventional programming language and is presented for execution by the central processing unit as object or byte code or written as inter-credit source code in a conventional interpreted programming language inter-credit credit by a language interpreter itself executed by the central processing unit as object, byte, or inter-credit code. Alternatively, the modules could also be implemented in hardware, either as intergraded circuitry or burned into read-only memory components. The various implementation of the source code and object byte codes can be held on a computer-readable storage medium, such as a floppy disk, hard drive, digital video disk (DVD), random access memory (RAM), read-only memory (ROM), and similar storage mediums. Other types of modules and module functions are possible, as well as other physical hardware components.

Figure 2:
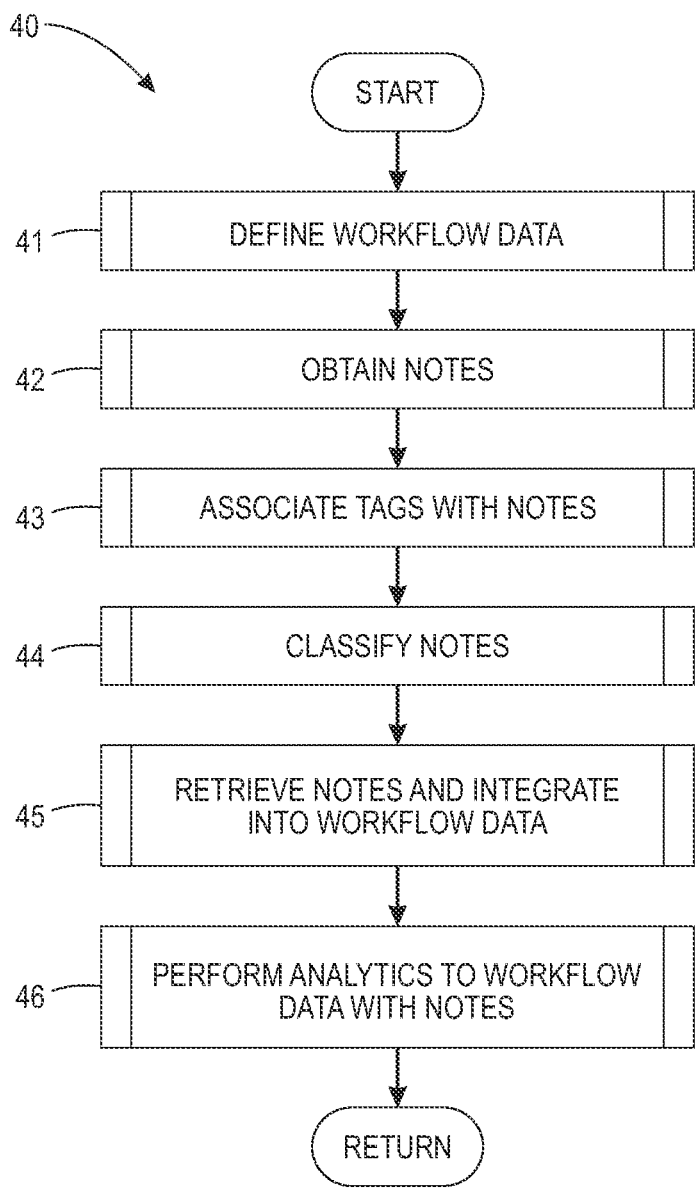
FIG. 2 is a flow diagram showing a computer-implemented method for integrating user observations into analytics data in accordance with one embodiment.

Integrating real-time user observations and intelligence into an organizational operating system allows consideration of personalized knowledge necessary for ongoing operations. FIG. 2 is a flow diagram showing a computer-implemented method 40 for integrating user observations into analytics data in accordance with one embodiment. In an organization, routine tasks and transactions necessary to operate the organization are often digitally managed by an organizational operating system. The organization operating system can be a standard, enterprise-wide collection of business processes and run complex business programs, such as workflow management system. The workflow management system is a software system for monitoring a defined sequence of tasks, arranged as a workflow. The workflow management system defines each task for an individual or a group of individuals in the organization and monitors ongoing processes regarding the task. Workflow data can be defined for an individual in the organization who is accessing the workflow data and displayed for the individual through a user interface, such as a Web interface application or mobile application, to perform the task (step 41).

A typical workflow management system is capable of controlling multiple levels of tasks and individuals in the organization. By way of example, FIG. 3 is a process flow diagram showing an organizational workflow 50 for use in the method of FIG. 2. In this example, three levels of individuals are involved in the organizational workflow, including agents 51, supervisors 53, and managers 55. Agents 51 are operating 52 individual tasks. Agents 51 typically report their performance of tasks through the organizational workflow to their supervisors 53 when the operation is completed so that the supervisors 53 can review the tasks 54. Managers and directors 55 oversee the organization and take responsibility on the activities in the organization as a whole. Managers 55 typically review 56 data which is statistically processed to see any trend or course of actions requiring immediate attentions by the managers 55. Then, the managers 55 can plan 57 goals to achieve certain outcomes beneficial for the organization. The supervisors 53 are informed about the plan from the managers 55 and create further plans 58 for the agents 51 to perform. In this way, the organizational workflow can be smoothly managed.

Figure 4:
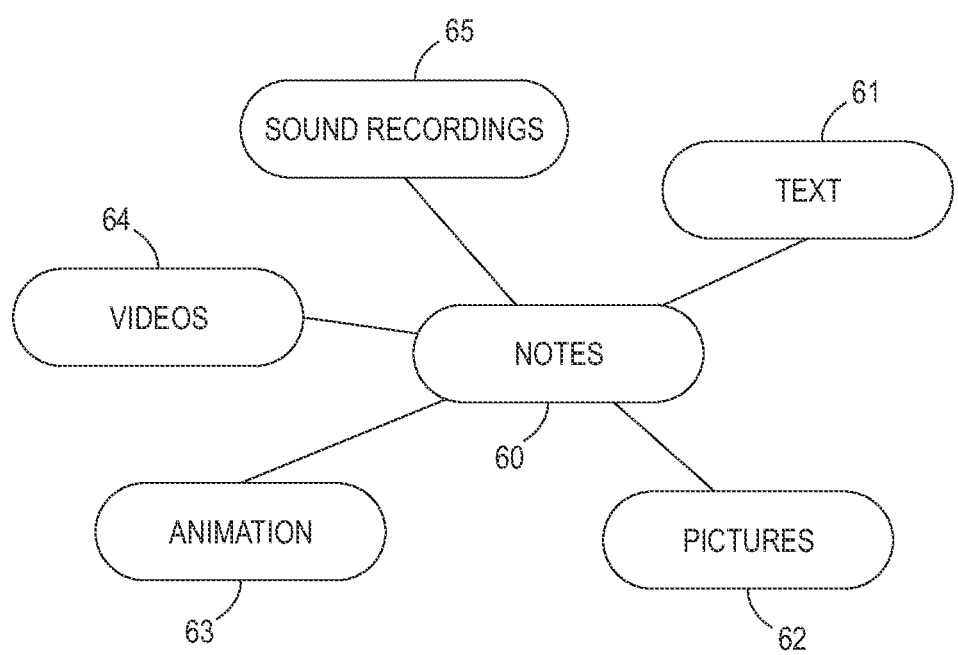
FIG. 4 is a functional block diagram showing examples of notes for use in the method of FIG. 2.

Referring back to FIG. 2, notes and annotations can be obtained from users of the operating system and maintained in a database interconnected to the operating system (step 42). Notes and annotations can be used by individuals in the organization for providing comments and additional remarks regarding each task they are performing. The notes can be entered into the operating system when they review and update workflow data through a user interface, such as a Web interface application or mobile application. FIG. 4 is a functional block diagram showing examples of notes 60 for use in the method of FIG. 2. The notes 60 can be provided in various forms, such as text 61, pictures 62, animation 63, videos 64, and sound recordings 65. An individual can use text 61 to describe the purpose and details of the note 60 and also can upload relevant pictures 62, animation 63, videos 64, and sound recordings 65. When the user of the operating system creates a note via the user interface, one or more tags can be associated with the note (step 43). Tags can be associated with each note in various ways, as further described infra with reference to FIG. 6. Tags are generally classified into categories. Thus, by tagging, the notes can be categorized based on a classification of the tags (step 44). The classification of the tags are further described infra with reference to FIG. 7. Each workflow data can specify criteria for retrieving notes. Notes for each workflow data can be selected by matching criteria with tags, and the selected notes are integrated into the workflow data (step 45). Once integration of the notes into the workflow data occurs, the note can be displayed in a context of the workflow data. Further, the notes integrated into the workflow data can be processed for obtaining analytics (step 46). In this way, the notes are directly integrated into the operating system and organized in a layered structure. Further, the operating system enables to reflect the user observations and remarks into the system. In addition, annotations by operators in the organization can provide further insights of actual operations in the organization and enable the organization to properly interpret, review, and plan the organizational operations.

Notes and annotations can be best used by operators in organizations, such as city transportation systems, public safety organizations, and hospitals, whose activities often exceed regular and routine operations due to fast changing environment. An example scenario can help to illustrate.

Example Scenario 1

| Time | Activity |
|---|---|
| Monday 7:30 AM | The traffic light turns yellow at N.E. 5th and N.E. Howard. Driver Smith quickly applies his truck's brakes and stops. Driver Jones is following close behind Smith and accelerating as he expected the truck to drive through the intersection. When Jones sees the flash of Smith's brake lights, his car collided with Smith's truck. The back end of Smith's truck is slightly damaged and the trailer hitch breaks through the grill and radiator of Jones' car. Steam erupts. Both vehicles stop. |
| 7:35 AM | The drivers exchange information and Jones calls 911 for help. The Bay City Police Department responds to 911 call as the traffic accident takes place within the city limit. The Bay City Police Department has established procedures for working with the citizens on the scene and also for coordinating with emergency services, the highway patrol, and the Department of Motor Vehicles (DMV). The operator redirects the call to a dispatcher for traffic operations. After receiving a radio call from his dispatcher, Officer Jackson heads for the scene of the accident. |
| 7:45 AM | Realizing that his car is disabled, Jones also calls his insurance company. They take down some information and arrange for Terry's Towing to come for Jones' car. Terry's Towing dispatches a tow truck from S.W. Sandy Blvd. They tell Jones that a truck will be there in about 45 minutes since the roads are busy during the morning commute. |
| 7:50 AM | Officer Jackson arrives on the accident scene. He determines that nobody is hurt. He tells the drivers to pull to the side of the road. Smith pulls over, but Jones' car is inoperative. |
| 7:55 AM | Officer Jackson offers to call a tow truck from Speedy Towing, which has a contract with the city and a guaranteed response time of 15 minutes. Jones tells Officer Jackson that his insurance company has already arranged for a truck. |
| 8:00 AM | Officer Jackson advises both drivers to file reports with the DMV within three days. Using his mobile device, he updates his duty status and enters in some of the information about the accident, including photographs from the scene. He puts out some traffic cones and flares and begins directing traffic around Jones' car, which is blocking a lane. |
| 8:30 AM | The tow truck from Terry's Towing arrives on the accident scene. A driver of the tow truck makes his arrangements with Smith and the car is towed away. |
| 8:35 AM | Officer Jackson gets back in his patrol car. From his mobile device, he closes out his activity on the accident case. Because he had to direct traffic for 45 minutes while waiting for the tow truck from Terry's Towing to arrive, he adds a note to the event. He clicks on the reason "waiting for tow" and types in that Smith had arranged for towing with his own insurance company. |

Figure 5:
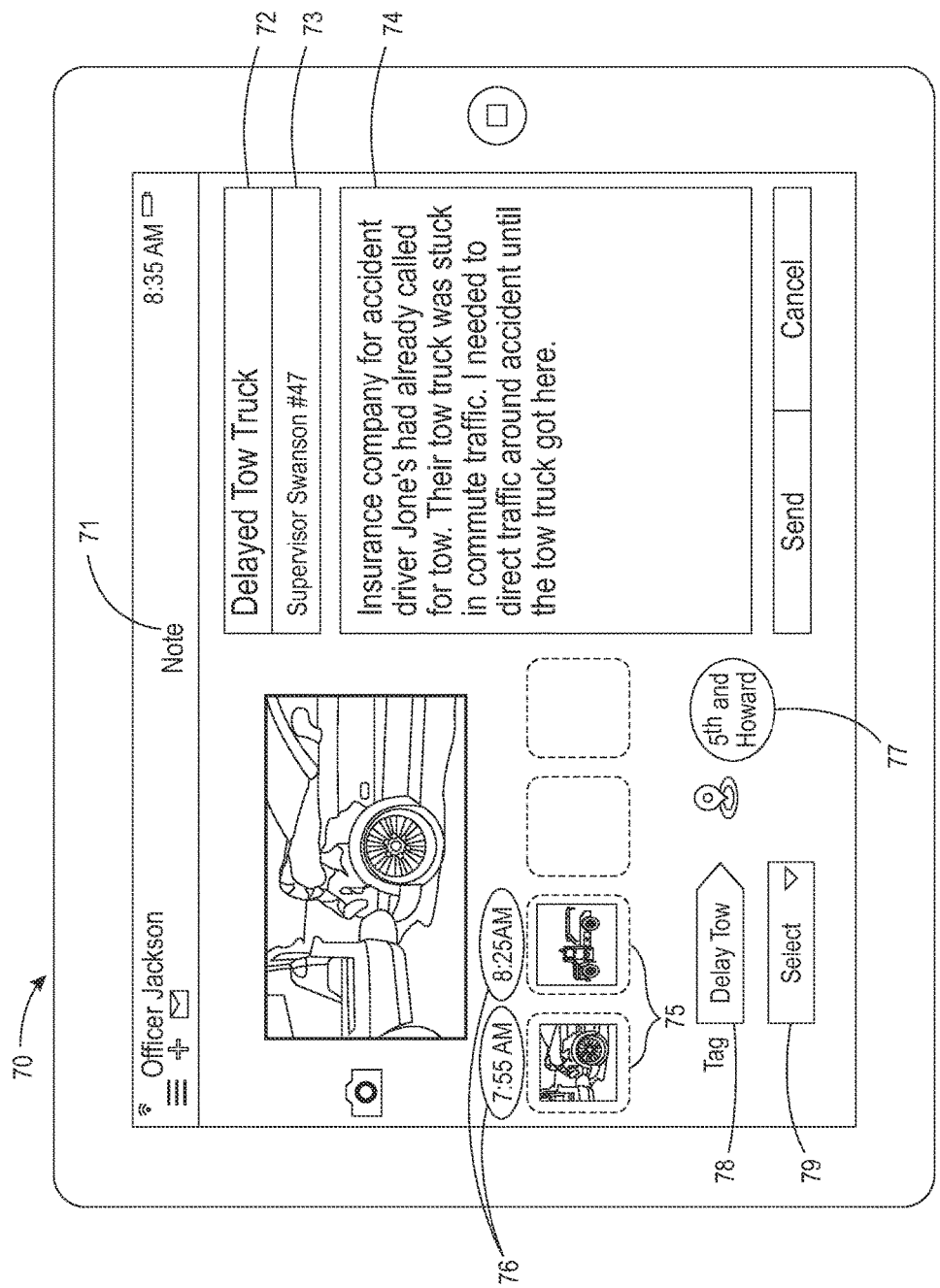
FIG. 5 is a diagram showing, by way of example, a mobile interface for creating a note.
Figure 6:
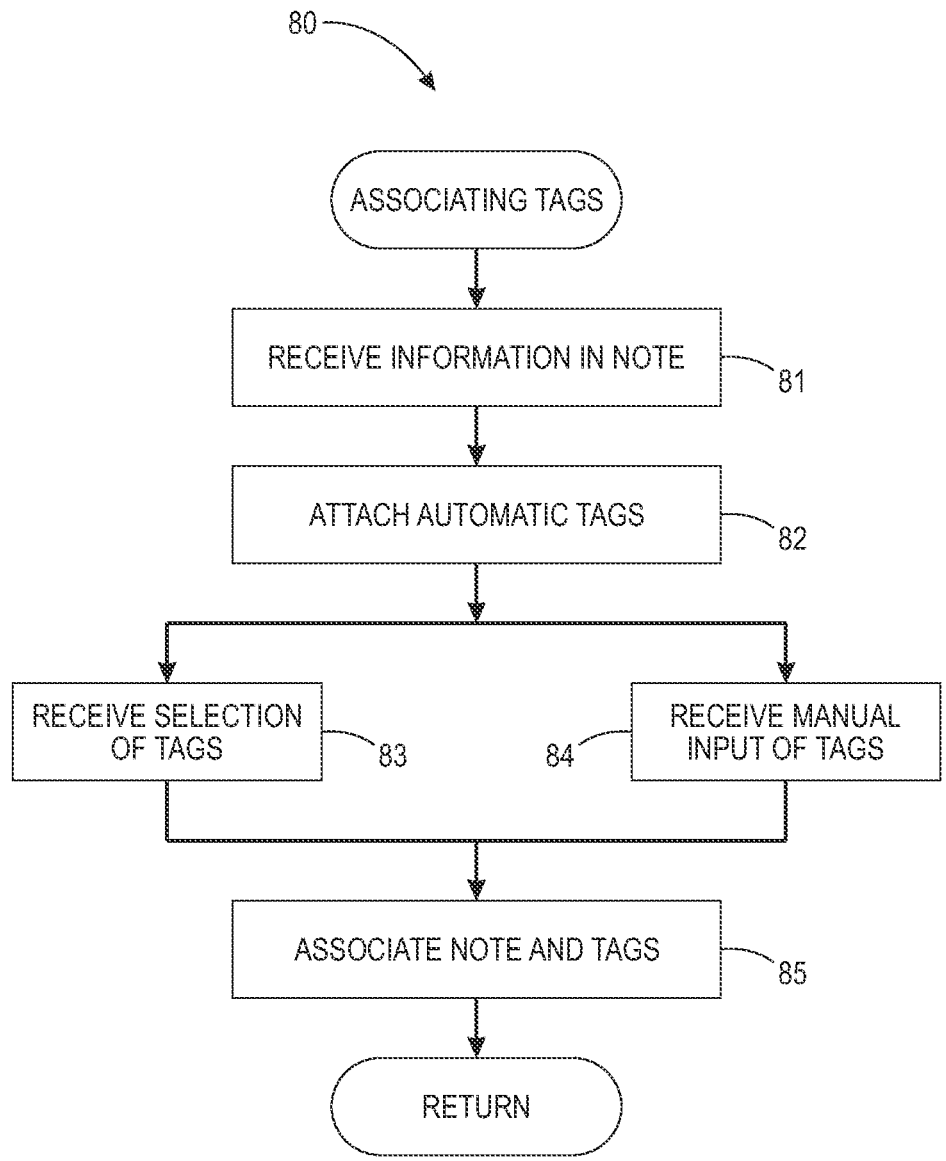
FIG. 6 is a flow diagram showing a routine for associating tags with notes for use in the method of FIG. 2.

According to this scenario, Officer Jackson, an agent of the Bay City Police Department documents the delayed towing event by leaving a note for explanation of the delay. The note can convey various forms of information besides text messages, as further described supra with reference to FIG. 4. By way of example, FIG. 5 is a diagram showing, by way of example, a mobile interface 70 for creating a note. A note 71 is created by Officer Jackson in relation to his duty report regarding the car accident illustrated in the above-discussed scenario. The note 71 can include a title 72 to describe a purpose of the note 71. In one embodiment, the note can be directed to a specific person 73, such as a supervisor or manager who reviews his duty report, or even another officer. Other kinds of persons to direct notes are possible. In this example, the note 71 is directed to Supervisor Swanson #47. The note 71 contains a field 74 for a user to enter in written information for providing further details of the note 71. Further, the individual can upload pictures 75 on the note 71 and also indicates time 76 of the pictures 74 taken. Officer Jackson took two pictures 75 at each 7:55 am and 8:25 am at the car accident scene to provide further details to the note 71. Further, the note can include a location 77 of the activity performed by the operator. Finally, a tag 78 can be specified in the note 71. FIG. 6 is a flow diagram showing a routine 80 for associating tags with notes for use in the method of FIG. 2. Once all the necessary information is entered in the note (step 81), a tag is specified. Tags can be automatically entered along the note is created (step 82). Such automatic tags can include author's identity, current activity, location, and time. Other types of automatic tags are possible. Further, by a creator of the note, tags can be selected from a collection of standardized tags (step 83). Referring back to FIG. 5, predefined tags can be provided by a pull down selection 79 and one or more tags 78 can be selected for a single note. The predefined tags can include accidents, power outage, road repair, construction site, excessive handicap stickers, and so on. In a further embodiment, the creator of the note can manually specify a tag in addition to or in lieu of the predefined tags (step 84). In this way, the note can be associated with one or more tags (step 85) and help to identify and track the notes based on the associated tags. Tags can specify time of relevance, priority, a specific group in relation to events, or even individual which the note can be delivered to. Other types of tags are possible.

Figure 7:
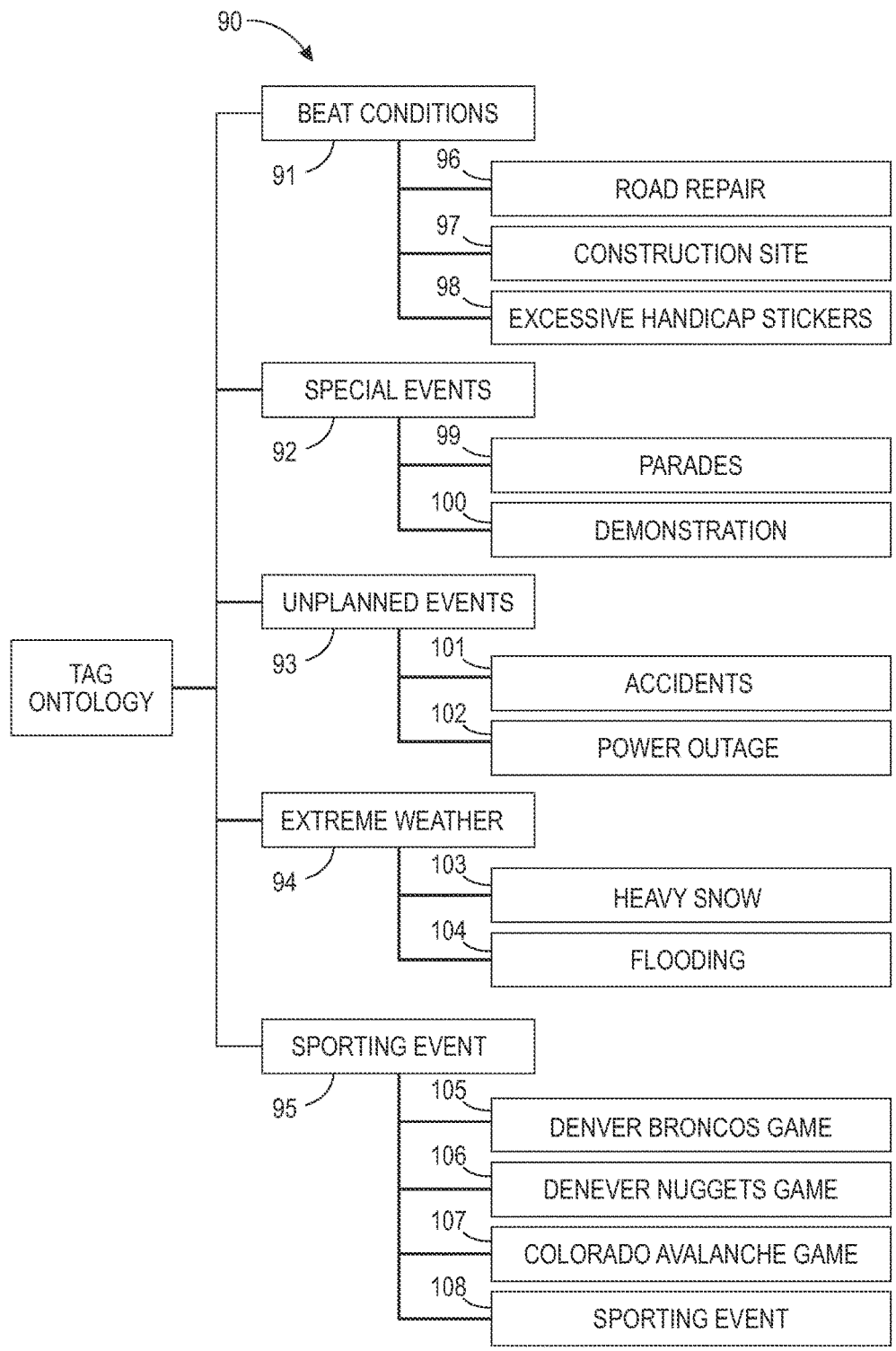
FIG. 7 is a functional block diagram showing, by way of example, an ontology of tags for use in the method of FIG. 2.

Ontologically categorized tags can simplify maintenance of tags in the operating system. Ontologies can be organized as directed graphs, hierarchies, list of lists as well as other forms of ontologies. FIG. 7 is a functional block diagram showing, by way of example, an ontology of tags 90 for use in the method of FIG. 2. By way of example, a hierarchy of tags related to tasks of Transportation Division in the Bay City Police Department is shown. The tag hierarchy 90 shows parent category tags 91-95 and child category tags 96-108. Child category tags 96-108 further classify each parent category tag 91-95. In one embodiment, the child category tags can be further categorized into grandchild categories as well as further descendants. Further, new tags can be easily created based on the ontology over time as new kinds of events and observations emerge as further described infra with reference to FIG. 20.

Notes associated with tags can be catalogued based on a classification of the tags. For relating the tagged notes with a part of the workflow data, each workflow data maintains criteria for retrieving notes. FIG. 8 is a flow diagram showing a routine 110 for retrieving notes into workflow data for use in the method of FIG. 2. Each workflow data defines criteria for retrieving notes (step 111). The criteria can include specific predefined tags maintained on the operating system, such as child category tags. Alternatively, the criteria can only indicate a parent category tags in the tag classification. Further, the criteria can specify a specific location within a region, a specific time in a time range, a specific date in a data range, or a specific person in the organization, as well as other types of criteria. Once the criteria is defined, the defined criteria are formed into a query for selecting notes (step 112). The query can be matched with a list of tags (step 113). For instance, if the query contains 4 tags, such as "Delay Tow," "Team 4," "Week 49," and "Enforce," a note created by Officer Jackson which associated with tags of "Delay Tow" and "Team 4" can be selected as well as other notes which tags include some of the tags in the query. The query can be matched to categories of tags, such as parent category tags (step 114). For instance, a query may include "Extreme Weather" tag which contains subcategories of "Heavy Snow" and "Flooding" (shown as 94, 103, and 104 respectively in FIG. 7). Alternatively, the query can be matched with a content of the note, including text, images, sound recordings, as well as other contents of the note where they are relevant. Once the notes are selected for each workflow data, the note with the tags are integrated into the workflow data (step 115). Notes can be integrated potentially at several places in the workflow data.

The operating system recognizes each integrated note as a part of the workflow data and categorizes the note based on the associated tags. Thus, when performing analytics of the workflow data, the integrated note can be first identified as data of the workflow data and then counted, combined, filtered, routed, and displayed in the specific analytics where the contexts of the note are relevant. An example scenario can help to illustrate how the integrated note is utilized and displayed on the operating system workflow data for reviewing.

| Example Scenario 2 | |
|---|---|
| Time | Activity |
| Monday 5:30 PM | Supervisor Swanson reviews the activities of the officers on her squad for the day. Analytics bring up statistics for their activities and also a flag on gaps in the officer's day or other things that fall outside of expectations. The analytic shows that Officer Jackson has a note requesting an exception approval on a "delay tow." Swanson opens the note to see the explanation about the exception. She sees that the insurance company for driver Jones called own towing service from S.E. Bay City. That explains why Jackson took so long on the event. She clicks to "Approve Exception." |
| Friday 4:30 PM | A few days later, Supervisor Swanson reviews the performance stats for her squad for the week before sending them up to her manager. The statistics break out the timing different kinds of assignments. The statistics for responding to and handling traffic accidents are all within the normal 20-minute range. In addition, exception cases are called out. She notices |

| Example Scenario 2 -continued | |
|---|---|
| Time | Activity |
| | that there were 4 instances this week of "waiting for tow" exceptions, with most of them under 60 minutes and one event over 60 minutes. |

Figure 9:
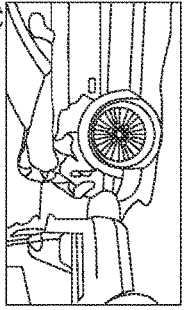
FIG. 9 is a screenshot showing, by way of example, a Web page of a table analytic for reviewing each agent's shift in a team.

According to the scenario, the note created by Officer Jackson appears on a shift review and an analytic of Officer Jackson's activities. FIG. 9 is a screenshot showing, by way of example, a Web page of a table analytic 120 for reviewing each agent's shift in a team.

By way of example, the Web page 120 shows an analytic for reviewing shifts 121 displayed for Supervisor Swanson 122. Structured data shows each officer's performance on citations 123 in team 4, beat averages 124, notes 125, and approvals 126. Supervisor Swanson 122 can see two approvals 127, 128 on her interface. When she clicks one of the Approvals "Delay Tow" 127, an approval request 129 is displayed as an individual window. Any approval request must be usually accompanied with notes to provide reasons for exceptions. In this case, the approval request 129 is associated with a note created by Officer Jackson at 8:35 am. Supervisor Swanson can take actions either to approve or reject the request by clicking "Approve" icon 130 or "Reject" icon 131 in the separate window 129. Supervisor Swanson can further have an option to create a note to the request by clicking "Add Note" icon 132 to enter any further information about the request or note. By approving the request, the note associated with the request is further classified and counted for data of "An approved exception" or data for "Approved tow truck" and no longer associate with data of "Approval request." Either way by being approved or not, data such as when and where the event occur, which officer is involved with the approval request can be kept and tracked.

Figure 10:
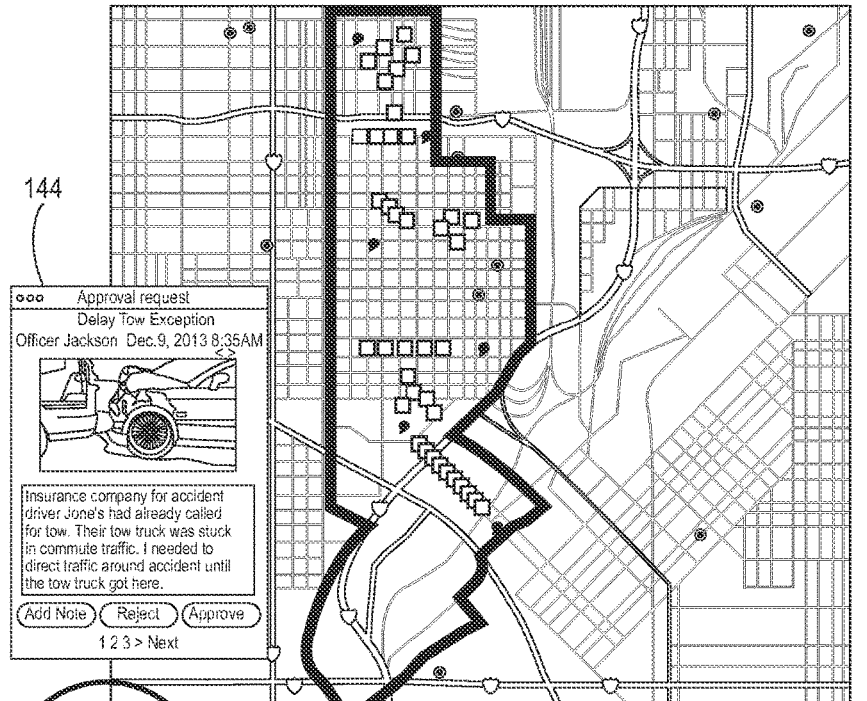
FIG. 10 is a screenshot showing, by way of example, a Web page of a map and timeline analytic for reviewing overall performance of each agent.

In a further embodiment, analytics can be shown as maps, timelines, charts, and other structures. FIG. 10 is a screenshot showing, by way of example, a Web page of a map and timeline analytic 140 for reviewing overall performance of each agent. The Web page 140 shows shift activities of Officer Jackson. Activities of Officer Jackson can be seen in a map view 141, timeline view 142, and summary view 145. In the timeline view 142, a large amount of time is assigned to "TT (tow truck)" event 143 in his duty status. Knowing that tow truck events generally take about 20 minutes, Supervisor Swanson can click an icon of TT 143 and see note explanation in a separate window 144 created by Officer Jackson regarding this TT event. Thus, even if there is no request made by Officer Jackson for exception approval, the note can still be displayed for Supervisor Swanson, such as a large time slot in the timeline.

Figure 11:
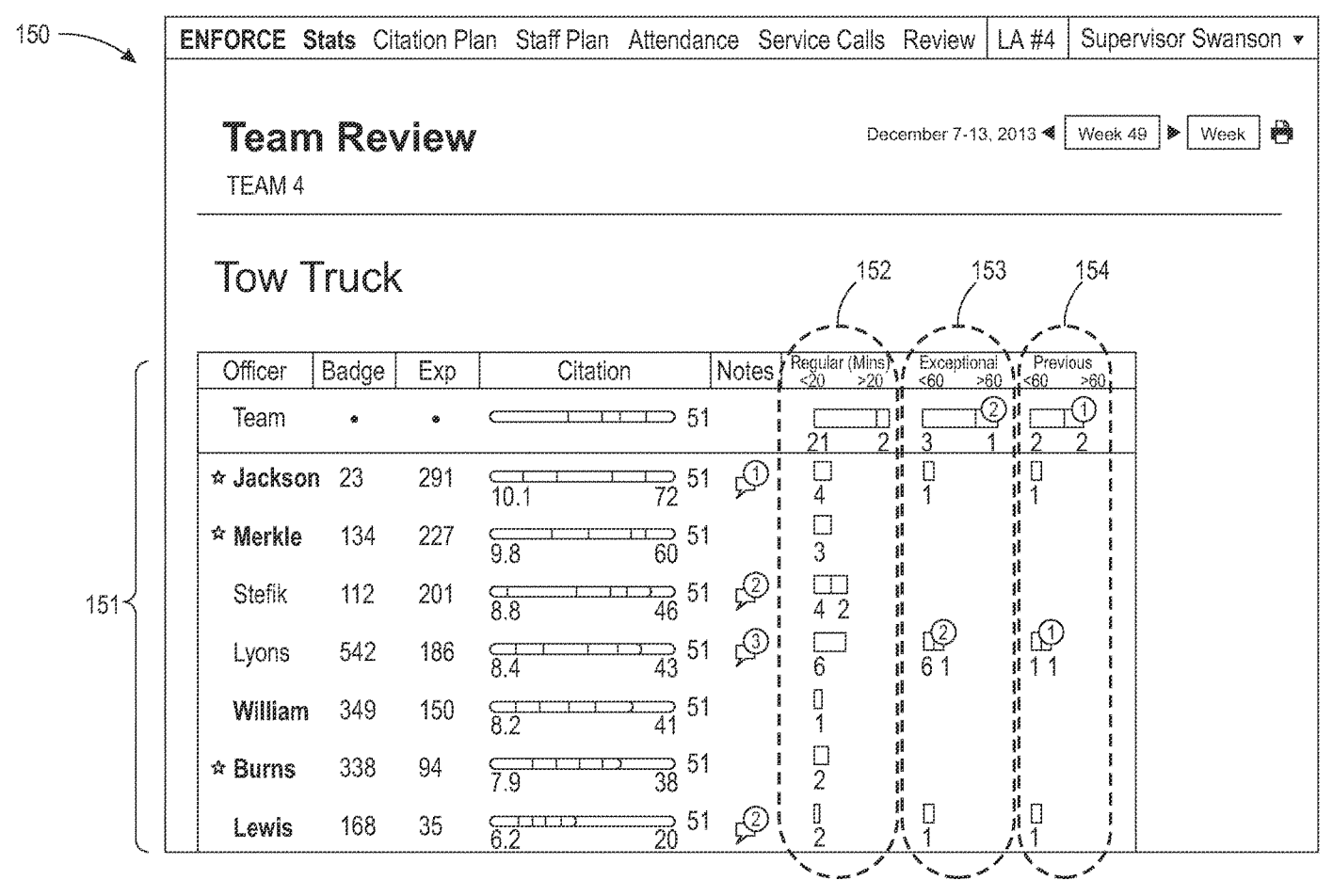

Similarly, tables can provide further details of the analytics. FIG. 11 is a screenshot showing, by way of example, a Web page of a table analytic 150 for reviewing performance of each agent for a specific task. A table 151 displays a summary of Team 4's performances, especially focusing on towing events. In one column 152, Supervisor Swanson can see a team summary of towing activities and find that except two tow truck events, twenty one tow truck events were completed within twenty minutes. In the next column 153, Supervisor Swanson can see that there are four exceptional cases but only one event taking more than sixty minutes. A further next column 154 shows that there was one tow truck event exceeding sixty minutes in the previous week.

The reflective analytic system can not only provide analytics for reviewing but for planning with consideration of notes. Typically, analytics implement statistical processing of quantitative objective data to obtain a certain pattern or trend in the data which is meaningful for individuals in the organization to review and plan. By integrating notes into the workflow data with help of tags, the integrated notes which typically include subjective qualitative data can be further utilized and displayed into the workflow data for planning. An example scenario will help to illustrate.

---

Example Scenario 3

The primary mission of the Mountain City Right of Way Enforcement Department is to ensure public safety. The mission includes enforcing the right of way and parking regulations in Mountain City. The mission also includes activities like directing traffic at schools at pick-up and drop-off times. A second goal is to generate revenue for Mountain City, since the funds collected from traffic and parking fines provide important support for the city's budget. As part of its planning cycle, a manager in the Department is accountable to the mayor and city council about revenue expectations. Goals vary for each month according to expected conditions. For example, months vary in the number of working days and holidays. The number of citations will also vary according to weather - such as when a snow storm shuts down Mountain City. Big tourist events and sports events in the city can also effect citations if they involve parades or other traffic duty. Still another factor is when schools are open or closed. In addition, there can be labor issues, such as staff vacations, retirements, or hiring that effect the organization's performance.

---

Figure 12:
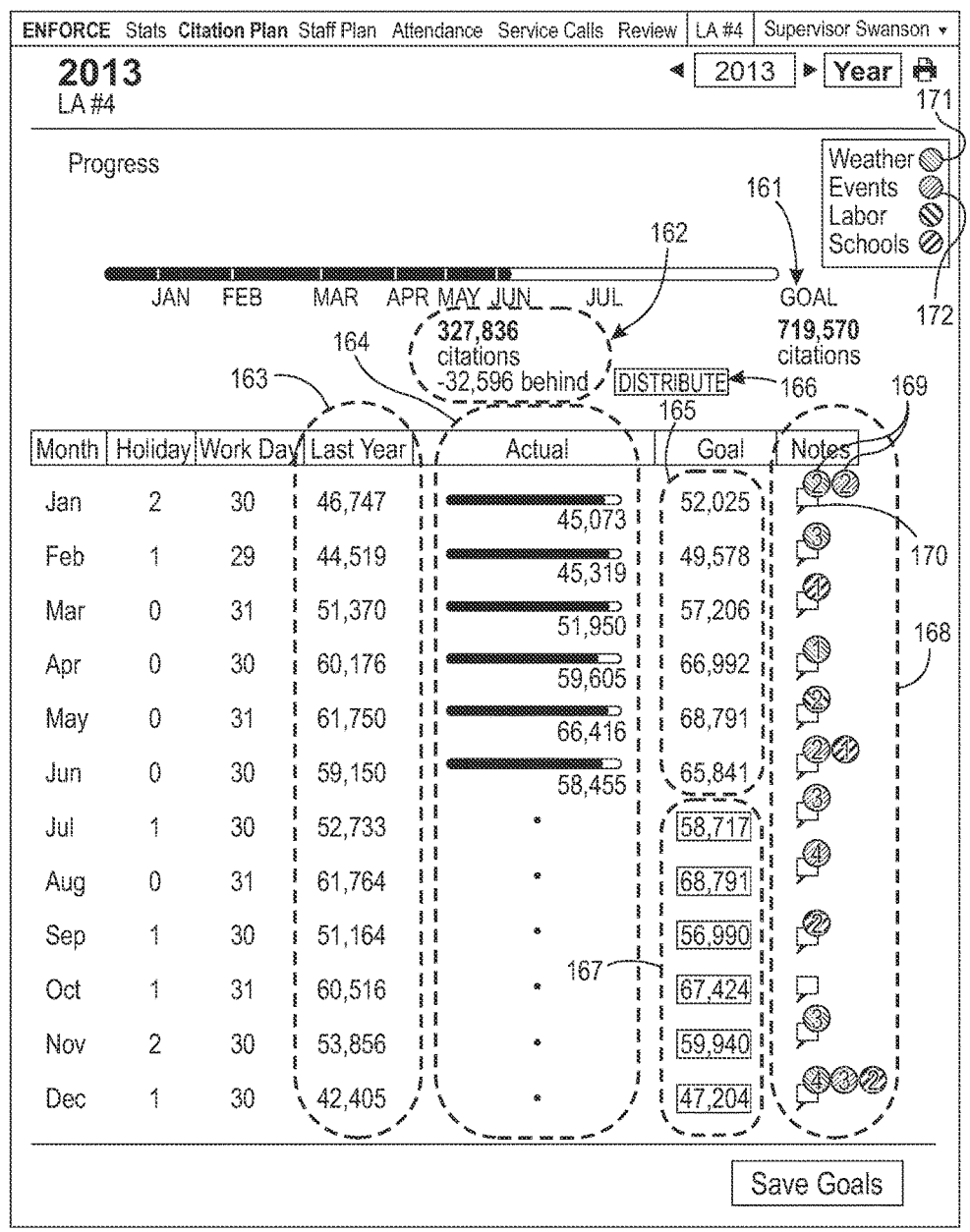
FIG. 12 is a screenshot showing, by way of example, a Web page of a table analytic for planning citation goals.

In this example scenario, a manager, for instance, Supervisor Swanson, can send a request to the operating system to perform analytics and establish targets for citations each month of an annual plan. FIG. 12 is a screenshot showing, by way of example, a Web page of a table analytic 160 for planning citation goals. The Web page 160 shows a target of citations for 2013 161 and the progress of the citations of 2013 as 327,836 citations issued until June 162. A column 163 indicates the numbers of citations for each month during the previous year. The next column 164 is designated to show actual numbers of the citations and the goal of citations for each month is shown in the further next column 165. The goal of citations for each month is adjusted for seasonal and event related considerations. However, the number of the citations tend to get behind from the goal each month and can be indicated in the progress of the citations 162, as "−32,596 behind." A column for notes 168 show notes relevant to citations planning. Numbers 169 above the note 170 can indicate categories of each note. For instance, in January, four notes are recorded and Supervisor Swanson can understand at glance that two notes are related to Weather 171 and other two notes are related to Events 172. The categories can be color-coded as well as other coding. In this Web page, 32,596 citations are short of the goal and by clicking "Distribute" icon 166, the shortage of the citations can be distributed to the remaining months in 2013 as 167 so that the citation goals can be successfully achieved. The distribution can be managed based on citation performance of the last year 163. However, the distribution can also be adjusted by Supervisor Swanson after review of notes in each month. Other ways to manage distribution are possible.

Figure 13:
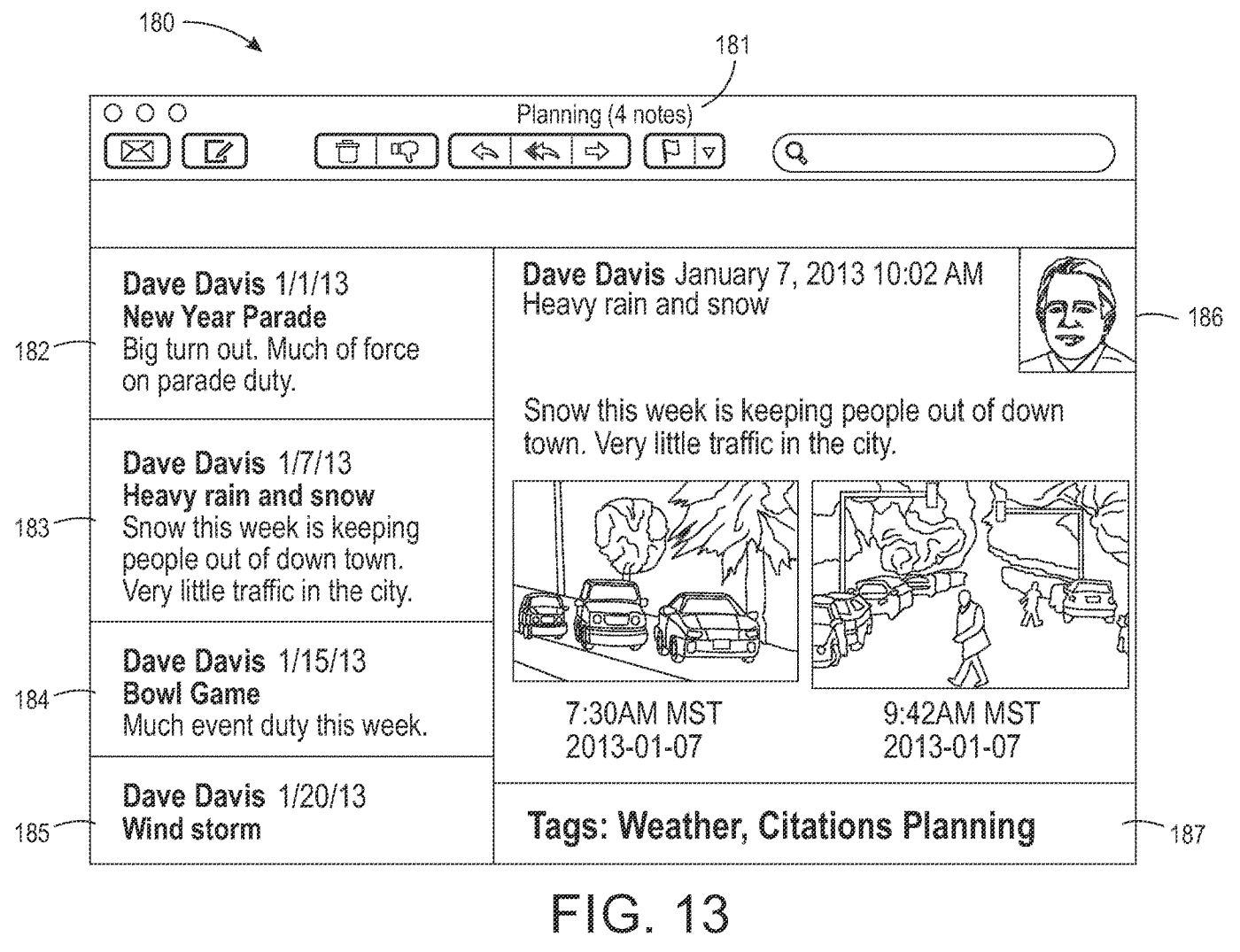

Notes in the planning interface can supply interpretations and expectations of analytic data and guide the manager or director to plan ahead with consideration of both quantitative and qualitative data. FIG. 13 is a screenshot showing, by way of example, a Web page 180 displaying notes for use in the table analytic of FIG. 12. A manager or director can review notes for explanation of the shortage of citations by clicking each note (170 in FIG. 12). For instance, four notes in January 2013 181, including two tagged as Weather and the other two tagged for Events can be shown as 182-184. A summary of each note is provided as a list 182-184 and by clicking one of the list 183, further details are displayed 186. The note contains a creator of the note, Dave Davis, date of the creation, title, comments, pictures and tags 187. Since the tags 187 include "Weather" and "Citation Planning," the note can be appropriately displayed in the citation planning interface (160 in FIG. 12). In this way, subjective observation introduced by notes can supply quantitative data for the manager or director to consider reasons for lower citations.

Analytics can also be performed to diagnose organizational performance as a whole and to revise priorities of activities in the organization with consideration of both subjective and objective data. An example scenario helps to illustrate.

---

Example Scenario 4

In the organization, each position performs each different role. Managers set organizational priorities and is responsible for the whole city. Supervisors oversee teams of officers, assigning beats and balancing schedules. And officers work their own beats, balancing public service activities and enforcement priorities.

| Day, Time | Person | Activity |
|---|---|---|
| Monday, 9 AM | Manager Mandy | Mandy Monroe, the manager of parking and traffic enforcement, reviews a dashboard showing current trends in the city. The trends are intelligently generated from nodes created by different people such as parking officers, citizen, police etc. Manager Mandy notices a recent trend related to double-parking violations and accidents showing on the left side of the dashboard. She clicks this trend and the system shows more detailed summary information about this trend on the right side of the dashboard. Manager Mandy finds there are increasing double parking violations and accidents reported in area 42 around 9 am to 10 am on Tuesday and Thursday. The day, time and location information are retrieved from the associated tags and content of the notes that generating this trend. Some original notes generating this trend are shown below the summary information. She clicks this trend and the system shows more detailed summary information about this trend on the right side of the dashboard. Manager Mandy finds there are increasing double parking violations and accidents reported in area 42 around 9 am to 10 am on Tuesday and Thursday. The day, time and location information are retrieved from the associated tags and content of the notes that generating this trend. Some original notes generating this trend are shown below the summary information. |
| | Manager Mandy | To confirm the information generated from the notes, Manager Mandy reviews the data of accidents and double-parking violations in area 42 on Tuesday and Thursday. She notices there has been a rise in accidents and enforcement of double-parking restrictions has been going down during 9:30 am to 10:00 am. She sees that delivery vehicles were indirectly involved in many of the accidents. In several cases delivery vehicles were double-parked adjacent to the accident. Sometimes an impatient driver behind the delivery truck drove around it and hit a jay-walking pedestrian. |

Example Scenario 4
In the organization, each position performs each different role. Managers set organizational priorities and is responsible for the whole city. Supervisors oversee teams of officers, assigning beats and balancing schedules. And officers work their own beats, balancing public service activities and enforcement priorities.

| Day, Time | Person | Activity |
|---|---|---|
| Monday, 9:10 AM | Manager Mandy | Manager Mandy decides to add a note to set a high priority for enforcing double parking restrictions at the accident times in area 42. The priority, day, time and location information are tagged in this note, and are used by the system to route the note to the right people automatically. |
| Tuesday, 7:00 AM | Supervisor Swanson | Susan Swanson is a sergeant who supervises traffic enforcement in the AM shift. She likes to review staffing assignments and priorities before her officers arrive for the morning shift. On Tuesday morning, Supervisor Swanson sees a note for a special assignment request from Manager Mandy in the complaints and requests inbox on her dashboard. Supervisor Swanson was alerted to view this note because the system identified her as the supervisor for the team that enforces area 42. Manager Mandy doesn't necessarily need to know which supervisor will see her note. The system does it for her automatically. Supervisor Swanson reviews the note by drilling down to the details (detail information with a map of location and time). She sees that there are three loading zone areas to be enforced on Tuesday and Thursday morning effecting three officers on her team. The request has a high priority. |
| Tuesday, 7:10 AM | Supervisor Swanson | Supervisor Swanson then looks at her team to see who is working and on the beats for the following week. She notices that Officer Oliver is working on beat 5 where the special enforcement request was made. Supervisor Swanson adds some information to the note to assigns Officer Oliver the special assignment of enforce loading zones. |
| Tuesday 8:15 AM | Officer Oliver | Officer Oliver is alerted to see the note before his shift begins. The note is routed to him because he is tagged in the note and he is assigned to beat 5, which is another tag in the note. Officer Oliver reviews the special assignments and beats and indicates on the device that he accepts the special assignments. |
| Tuesday, 10:00 AM | Officer Oliver | Officer Oliver observes the blocks in area 42 for 30 minutes and cited some delivery vehicles for double-parking violation. He notices it is a busy commercial area and one of the reasons causing double-parking violations is the current loading zone is too small. After completing this special assignment, he adds a note indicating he has finished the assignment and there is a need for larger loading zone. |
| Monday (two weeks later), 10:00 AM | Manager Mandy | Manager Mandy checks to see (1) how the organization is responding to her priorities, and (2) whether accidents are decreasing in response to increased enforcement. She sees the number of citation for double-parking violation has increased and the number of accidents in the same area has decreased. She also notices there is a need to increase the loading zone spaces from the note input from Officer Oliver, and puts it as an issue for future evaluation. |

Figure 14:
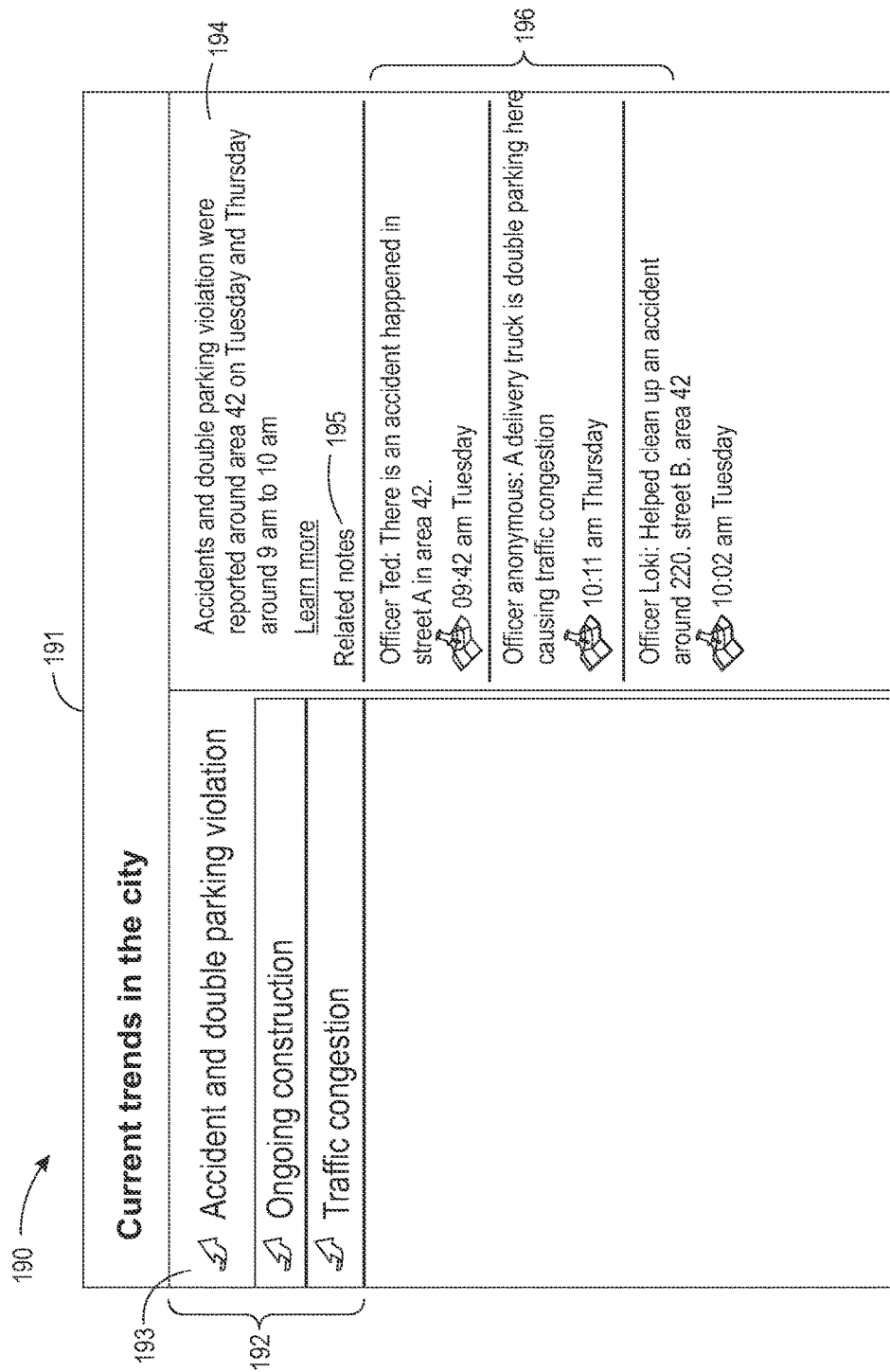
FIG. 14 is a screenshot showing, by way of example, a Web page displaying trends.
Figure 15:
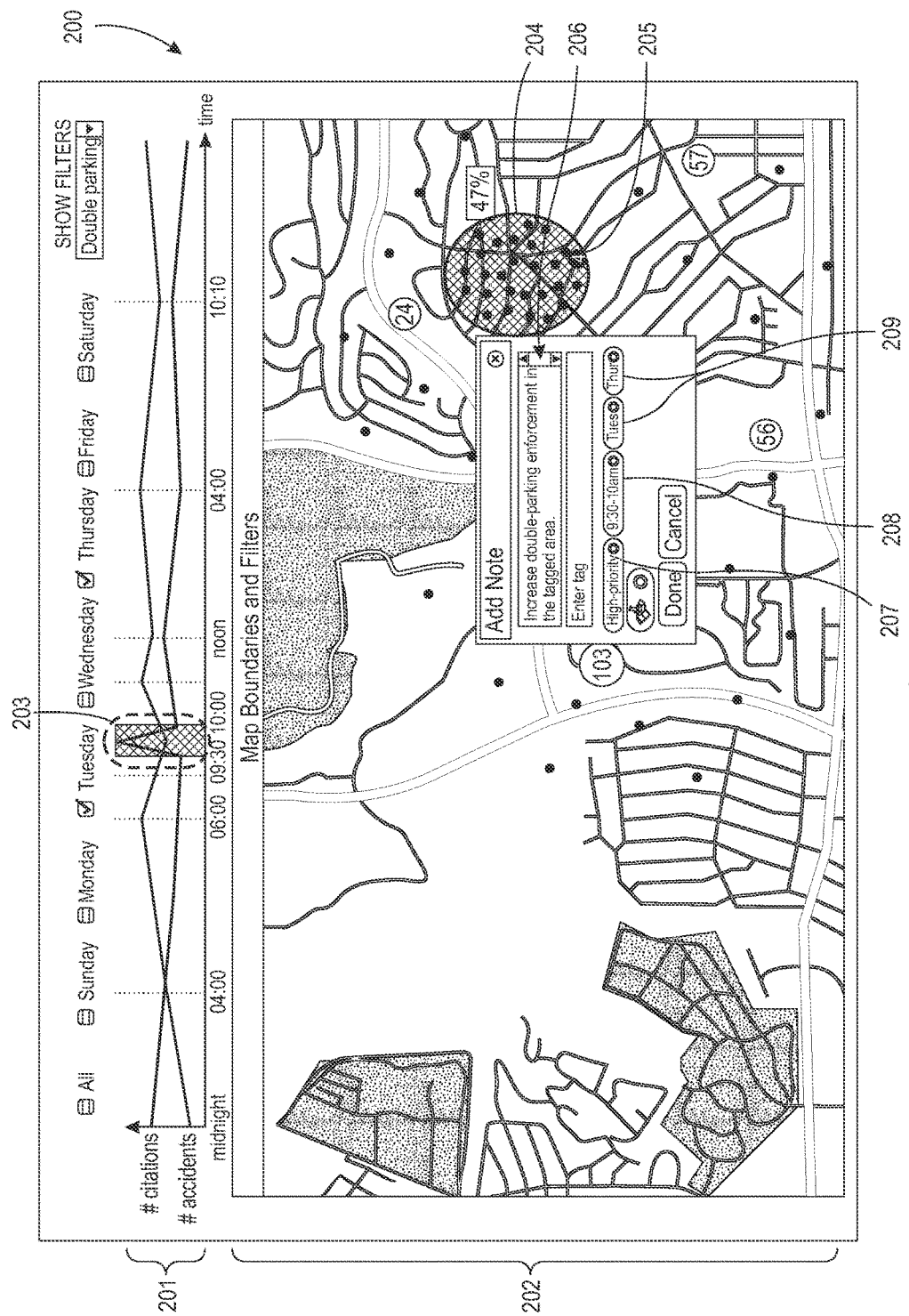
FIG. 15 is a screenshot showing, by way of example, a Web page of a map and timeline analytic for displaying trends of accident and double parking with a note.

According to the illustration of the example scenario, a trend in the city is generated by the operating system from the workflow data including input from parking officers, citizen, and police. FIG. 14 is a screenshot showing, by way of example, a Web page 190 displaying trends. Trends 191 show three trends 192, including accident and double parking violation 193. By selecting the trend of accident and double parking violations 193, a detailed summary 194 is showed with notes 195. Each note 196 can contain comments from creators of the notes 196 and automatic tags can specify a day, time, and location information. FIG. 15 is a screenshot showing, by way of example, a Web page of a map and timeline analytic 200 for displaying trends of accident and double parking with a note. The map interface indicates a timeline view 201 and map view 202 and shows a trend of increased incidents 203, 204 in the time line view 201 and in the map view 202. Each dot in the circle 204 represents one accident and a number in a bubble 205 represent a number of citations nearby areas. Manager Mandy can create a note 206 to set a high priority 207 for enforcing double parking restrictions at 9:30-10:30 am 208 on Tuesdays and Thursdays 209. The priority, day, time, and location information are tagged 207-209 and can automatically route the note to individuals in a group, such as a group to which Manager Mandy belongs, a group specified by a level of priority, and a group of each tag specifies. Other types of automatic routing are possible.

Figure 16:
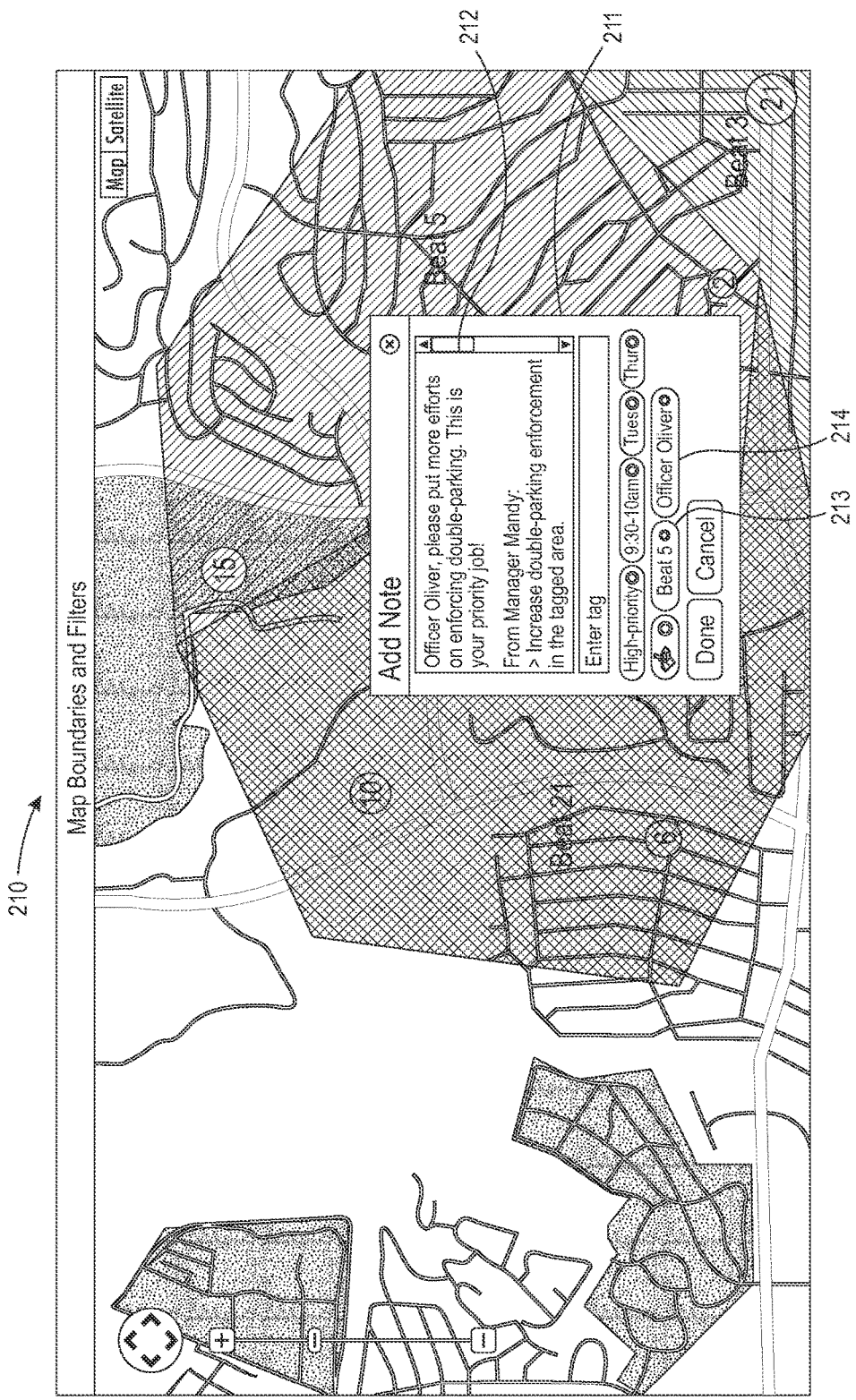
FIG. 16 is a screenshot showing, by way of example, a Web page of a map analytic for displaying trends of accident and double parking with a note responding to the note of FIG. 15.
Figure 17:
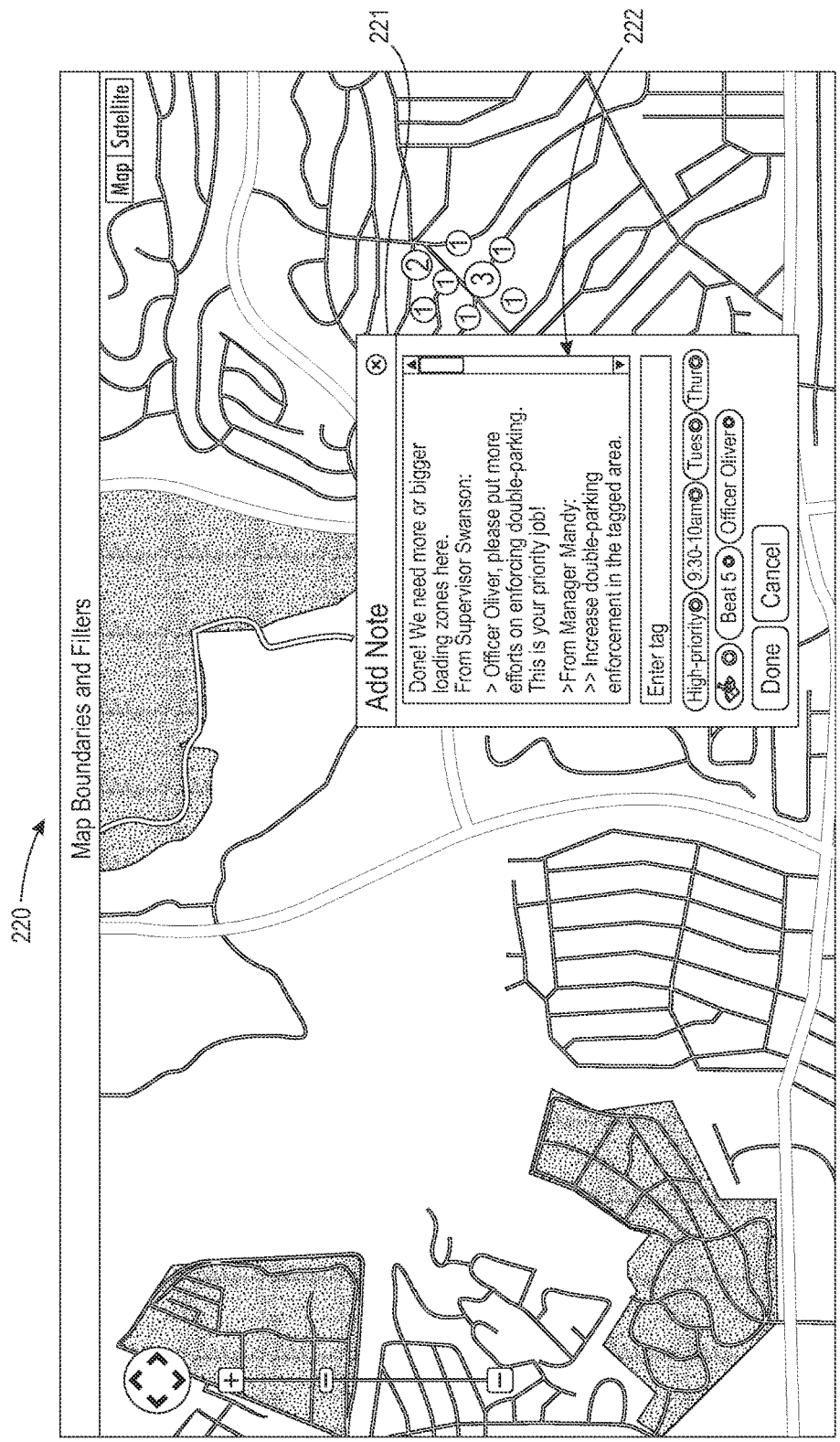
FIG. 17 is a screenshot showing, by way of example, a Web page of a map analytic for displaying trends of accident and double parking with a note responding to the note of FIG. 16.

A specific individual to whom the note is routed can add further information and tags to the note. FIG. 16 is a screenshot showing, by way of example, a Web page of a map analytic 210 for displaying trends of accident and double parking with a note responding to the note of FIG. 15. The note 211 provides a field of comments to add by a person who is reviewing the note 211 and new tags 213, 214. In this example scenario, Supervisor Swanson reviews the note created by Manager Mandy and responds with the request of increase for double-parking enforcement. Supervisor Swanson instructs Officer Oliver who is working on Beat 5 by way of tags 213, 214 and comments 212. FIG. 17 is a screenshot showing, by way of example, a Web page of a map analytic 220 for displaying trends of accident and double parking with a note responding to the note of FIG. 16. Also in this example, Officer Oliver is prompted to perform a special assignment from Supervisor Swanson and adds a note 221 responding to the note thread including comments from Supervisor Swanson and Manager Mandy for showing that his assignment has been completed in a field 222. Office Oliver can also initiate a note inferring a necessity of the more loading zones.

Figure 18:
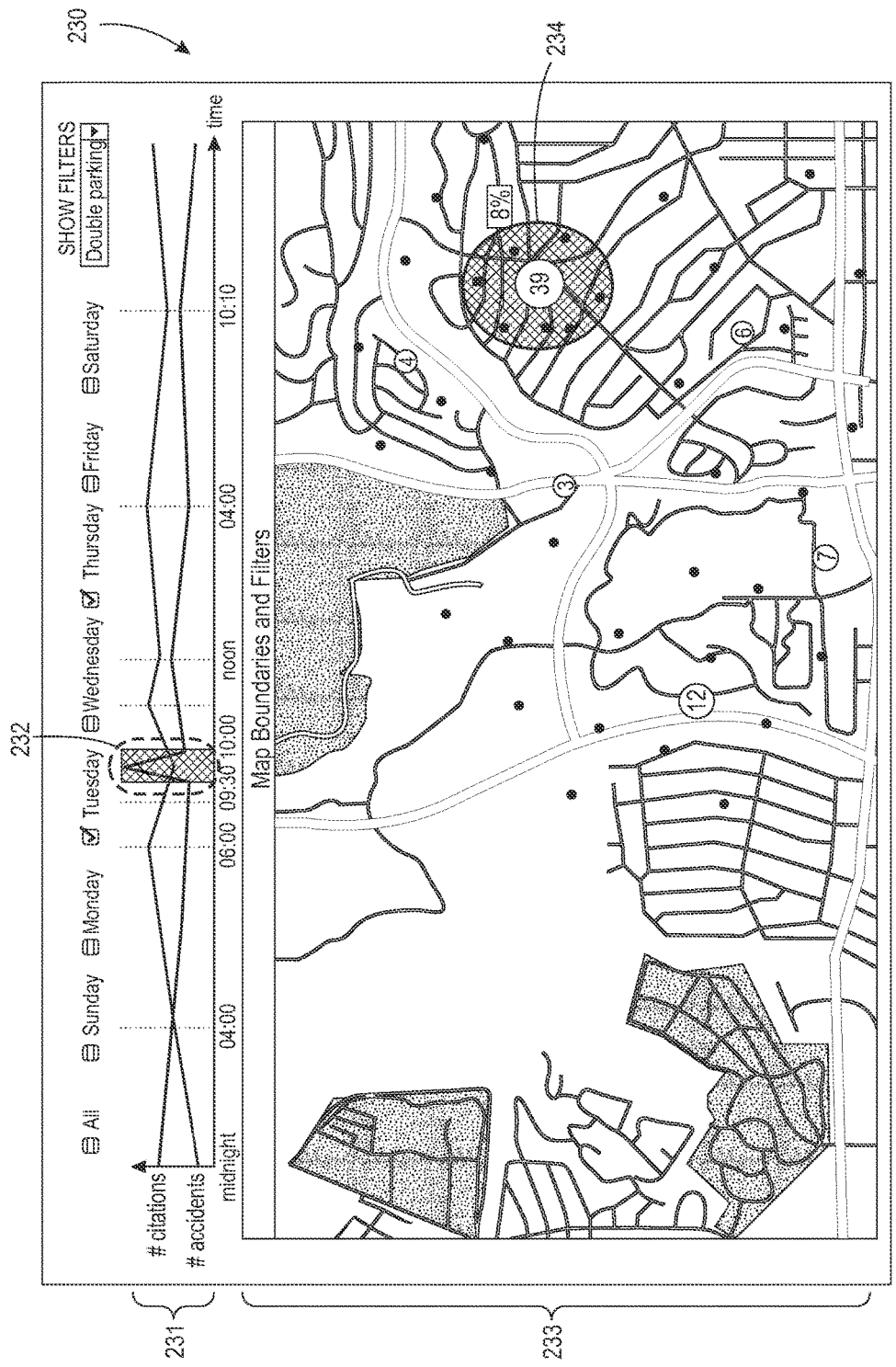
FIG. 18 is a screenshot showing, by way of example, a Web page of a map analytic for reviewing trends of accident and double parking.

A creator of the initial note can track and review the note and analytic any time after she issues the note. FIG. 18 is a screenshot showing, by way of example, a Web page of a map analytic 230 for reviewing trends of accident and double parking. The timeline analytic 231 displays an increase in numbers of citations and decrease in numbers of accidents 232. Similarly, the map analytic 233 displays a decrease of accidents in the area 234 by way of showing an increase of citations and decrease of accidents. This example scenario illustrates how the organization can be guided by a top level of individuals, such as managers, in the organization and activities responding to the guidance taken by supervisors and agents in the organizations can be tracked and displayed for review by the managers.

By way of overview, integrating notes based on human observations into data for analytics supports better informed decision making in the organization regarding daily activities which are typically outside of databases and impractical to be incorporated as data. The capability of this reflective analytics system would further development of enterprise software for organizations and demonstrate a wide range of applicability, such as local governments as "Smart Cities," hospitals as "Smart Hospitals" and so on. Other examples of environment to apply the reflective analytic system are possible. Specifically, in traffic and parking enforcement systems, the reflective analytic system would prove a strong value in many situations to integrate human observations, including increasing numbers of suspicious or fake permits, bagged or broken meters, faded, defaced, or damaged signs, road hazards, upcoming construction projects, changes in the neighborhood and businesses, feedback regarding the size of beat, observations regarding a degree of danger in areas, number of handicap stickers in use in areas, and price changes of off-street parking. Other types of human observations are possible.

As notes integrated into the reflective analytics system are organized and managed with aid of tags, the notes can be easily searched and accessed. FIG. 19 is a screenshot showing, by way of example, a Web page 240 for searching notes from a database. Any individual in the organization can use a search interface 240 to retrieve a note stored in the database. The search can be conducted by inputting text in a field 241 and executing a search query including the text. The execution of the search query can be done by matching the text with tags or categories of tags. Other ways of retrieving notes are possible. In addition to the basic search function, a result of the search 242 can be filtered by filters 243. The filters 243 can limit the search result 242 based on time range of search, a position or level of the creator in the organization, a time of shift, region, squad or group, or a limitation of search area, such as note body, note tags, note author, and note commentator. Other types of filters are possible. The search result 242 can indicate a summary of the note, time and date of creation, tags associated with the note, as well as other information.

Figure 20:
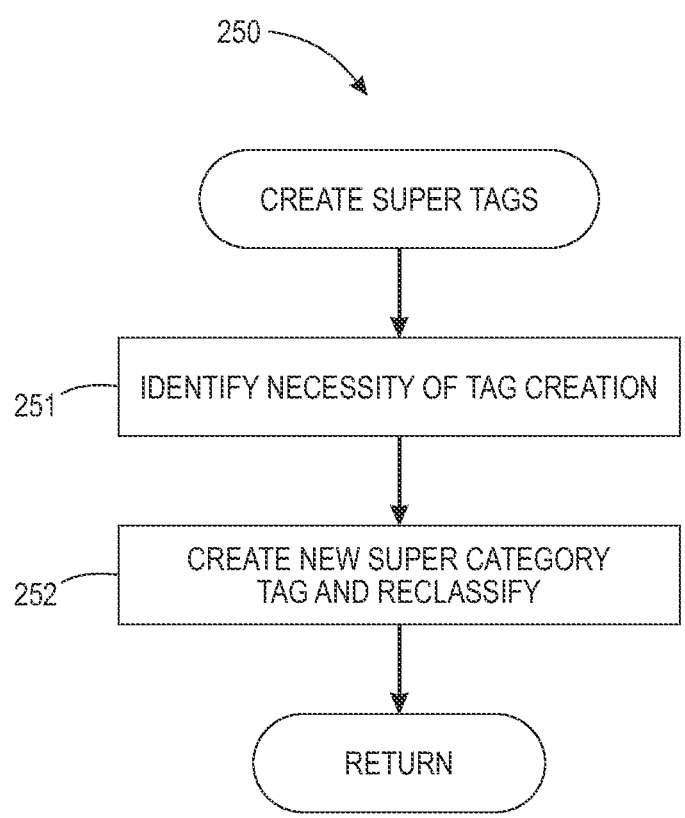
FIG. 20 is a flow diagram showing a method of creating super tags.

Tags are generally managed by the reflective analytics system. Over time, the reflective analytics system can review usage of each tag, add and delete tags, and modify a classification of tags mentioned supra in FIG. 7. FIG. 20 is a flow diagram 250 showing a method of creating super tags. Super tags or categories can be created overtime as new kinds of events or observations are found. Example scenarios illustrate creating new tags in the ontology.

| Example Scenario 5 |
|---|
| Weather events can sometime affect operations in the city. The Bay City experienced a heavy snowfall and high temperatures last year. The operating system generates "# Heavy Snow" and "# High Temperatures" tags for use by officers in the Bay City Police Department. A few months into use of the tags, the Bay City experiences extremely heavy rain and flooding. These events result in use of "# Heavy rain" and "# Flooding" tags by the officers for providing explanations to unusual events and incidents caused by heavy rain or flooding. In the absence of an ontology of tags, those tags cannot be recognized in the same family of the categories with "# Heavy Snow" and "# High Temperatures" tags and a new tag "# Extreme Weather" cannot be generated as a super category. |

| Example Scenario 6 |
|---|
| Sport events often put demands on city traffic control and officer deployment. An operating system was put in place and, in the first few months, tags such as "# Broncos Game" and "# Colorado Rockies" were used. Over the months, other tags, such as "# Denver Nuggets," "# Colorado Avalanche," and "Colorado Rapids" tags are added. A super category such as "# Sporting Event" simplifies organization of tags. |

Since each workflow data contains criteria for retrieving notes and the criteria are not often updated, super tags or categories would help to associate new tags and workflow data. For instance, a workflow data, such as parking citation performance for Officer Jackson, contains "# Heavy Snow" and "# High Temperatures" as note retrieval criteria, "# Flooding" and "# Heavy Rain" tags will not be associated with the workflow data. If a super category for all four tags, such as "Extreme Weather" is created, the workflow data may be associated with "# Flooding" and "# Heavy Rain" when matching the criteria with the category of the tags. For creating a super tag or category, first, necessity of creating a new tag is identified (step 251). Conditions indicating the necessity can be automatically determined based on a numerical threshold. For instance, if four similar tags in one category are identified, the number of four tags can trigger the creation of a super tag. Other ways to automatically identify the necessity are possible. Alternatively, a super tag can be manually created by any individual in the organization or a group of individuals in the organization who has authorization to make such addition. The new super tag can be created and the classification of tags are reclassified (step 252). Other circumstances to create a super category or tag are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for integrating user observations into operational data with the aid of a digital computer, comprising the steps of:
   maintaining notes in a database comprised in a storage medium, each note having been received from a user and comprising a subjective observation;
   maintaining in the storage medium a plurality of categories of tags, each of the categories comprising a plurality of the tags;
   defining operational data comprised in the storage medium and comprising workflow data of an objective nature;
   associating each of the notes with one or more of the tags with a computer processor and memory with the computer processor coupled to the non-transitory computer readable storage medium and further maintaining the note associated with the tags in the database with the computer;
   defining criteria for retrieving one or more of the notes for the workflow data, the criteria comprised in the storage medium and forming a query for each of the workflow datum based on the criteria, the query comprising at least one of the categories of the tags;
   executing the query with the computer to select one or more of the notes associated with the at least one of the tags comprised in the at least one category in the query for the workflow data and integrating the selected notes with the computer into the workflow data; and
   displaying the workflow data with the computer with the integrated note on a display.

2. A method according to claim 1, further comprising:
   generating with the computer summaries of each of the notes; and
   utilizing with the computer the summaries of the notes comprising at least one of:
      analyzing with the computer a trend of the notes for organizing the categories of the tags based on the summaries; and
      identifying with the computer the workflow data matching with the summaries of the notes.

3. A method according to claim wherein the classification of the tags is organized as at least one of a directed graph, hierarchy, and lists of lists.

4. A method according to claim 3, further comprising:
recognizing with the computer one or more of the categories which are related each other; and
creating with the computer a category above the related categories as a new category.

5. A method according to claim 1, further comprising:
providing with the computer predefined tags to each note comprising information at least one of day, time, and location when the note is created, identifier of the user, and work activity of the user.

6. A method according to claim 1, further comprising at least one of:
providing with the computer predefined tags for selecting by the user for associating with the note; and
providing with the computer a field on a user interface to enter tags manually by the user for associating with the note.

7. A method according to claim 1, wherein the notes comprise at least one of text, pictures, videos, animation, and sound recordings.

8. A method according to claim 1, wherein the notes comprise at least one of time created, location, title of the note, name of the user, comments, priority, request for exception, and purpose of the note.

9. A method according to claim 1, further comprising:
identifying with the computer a receiver of the note when the tag is associated with the note; and
routing with the computer the note associated with the tag to the identified receiver.

10. A method for integrating user observations into analytics data with the aid of a digital computer, comprising the steps of:
maintaining organizational workflow data of an objective nature comprising structured data comprised in a storage medium for operating transactions in an organization;
maintaining in the storage medium a plurality of categories of tags, each of the categories comprising a plurality of the tags;
maintaining annotations in a database comprised in a storage medium, each annotation having received from a user who belongs to the organization as a creator and comprising a subjective observation;
tagging with a computer processor and memory with the computer processor coupled to the non-transitory computer readable storage medium each of the annotations with one or more of the tags;
embedding with the computer the tagged annotation into the structured data by determining with the computer relevance of the tagged annotation to each of the structured datum, comprising defining criteria for retrieving the tagged annotation for the workflow data, the criteria comprised in the storage medium, forming a query for each of the workflow datum based on the criteria, the query comprising at least one of categories of the tags, and executing the query with the computer to select the tagged annotation; and
performing data processing of the structured data with the computer and visualizing, on a user interface with the computer, analytics data based on the processed structured data with the embedded tagged annotation.

11. A method according to claim 10, further comprising:
displaying with the computer the analytics data with the embedded tagged annotation for one group of the users in the organization on the user interface;
receiving with the computer a request for obtaining another analytics data from other group of users in the organization;
rearranging with the computer the analytics data for use by the other group of users; and
presenting the rearranged analytics data on the user interface with the computer for the other group of users with the embedded tagged annotation.

12. A method according to claim 10, further comprising:
determining with the computer the tagged annotation as relevant for the structured data by matching each query for each of the structured data with each category for each tag.

13. A method according to claim 10, further comprising:
maintaining with the computer an interface for search of the annotation in the database, comprising:
generating and storing with the computer summaries of the annotations in the database;
performing with the computer search of the annotations based on at least one of the summaries and tags associated with the annotations; and
displaying with the computer a result of search of the annotations.

14. A method according to claim 13, further comprising:
filtering with the computer the result of search for display by at least one of time window, location, identity of the user who created the annotation, and ranking of the user who created the annotation.

15. A method according to claim 10, further comprising:
identifying with the computer an alert attached to the embedded tagged annotation;
determining with the computer one or more of receivers of the embedded tagged annotation based on the alert;
displaying with the computer the embedded tagged annotation to the determined receivers on the user interface.

16. A method according to claim 15, further comprising at least one of:
identifying with the computer a group of the users of the structured data as the receivers based on at least one of summary of the annotation and the tag; and
receiving, from at least one of the users in the organization, with the computer one or more of specific users of the structured data as the receivers.

17. A method according to claim 15, further comprising:
receiving with the computer a response to the alert by at least one of the receivers; and
reflecting with the computer the response to the embedded tagged annotation.

18. A method according to claim 10, wherein the analytics data is shown as at least one of maps, timelines, charts, and tables.

19. A method according to claim 10, wherein the user interface is provided as at least one of dashboard application and Web application.

* * * * *